US012429191B2

(12) United States Patent
Hagemann et al.

(10) Patent No.: US 12,429,191 B2
(45) Date of Patent: Sep. 30, 2025

(54) ILLUMINATION DEVICE

(71) Applicant: Schott AG, Mainz (DE)

(72) Inventors: Volker Hagemann, Mainz (DE); Ulrike Stöhr, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 18/462,861

(22) Filed: Sep. 7, 2023

(65) Prior Publication Data

US 2024/0084998 A1 Mar. 14, 2024

(30) Foreign Application Priority Data

Sep. 9, 2022 (DE) ..................... 10 2022 123 050.3

(51) Int. Cl.
*F21V 9/30* (2018.01)
*F21K 9/60* (2016.01)

(52) U.S. Cl.
CPC . *F21V 9/30* (2018.02); *F21K 9/60* (2016.08)

(58) Field of Classification Search
CPC . F21V 5/004; F21V 5/005; F21V 5/00; F21V 9/30; F21K 9/60
See application file for complete search history.

(56) References Cited

U.S. PATENT DOCUMENTS 9,409,811 B2 8/2016 Rindt et al.
11,415,808 B1 * 8/2022 Sharma .............. G02B 19/0061
2004/0183081 A1 9/2004 Shishov et al.
2010/0097809 A1 4/2010 Munro et al.
2015/0364662 A1 12/2015 Wang
2016/0010821 A1 1/2016 Ahn et al.
2016/0223158 A1 * 8/2016 Park ...................... F21V 7/0041
2019/0097095 A1 * 3/2019 Yamanaka .......... H01S 5/02326
2022/0077369 A1 3/2022 Scheicher et al.
2022/0082847 A1 3/2022 Obinata
2022/0221129 A1 7/2022 Cornelissen et al.

FOREIGN PATENT DOCUMENTS

WO 2006/109113 A2 10/2006
WO WO-2016158542 A1 * 10/2016

OTHER PUBLICATIONS

Innovation Q+ NPL Search (Year: 2024).*

* cited by examiner

*Primary Examiner* — Anabel Ton
(74) *Attorney, Agent, or Firm* — TAYLOR & EDELSTEIN, PC

(57) ABSTRACT

An illumination device includes a light source, a light conversion element with a front side, an optical element, and first and second optical interfaces, wherein (a) an outer surface of the optical element includes a first surface area extending obliquely to the front side, so that secondary light can be decoupled at the second optical interface from the optical element into the surrounding medium in a direction which has a smaller angle in relation to the normal of the front side than if the first surface area extended in parallel to the front side of the light conversion element, and/or (b) the outer surface includes a second surface area extending obliquely to the front side of the light conversion element, so that secondary light can be reflected at the second optical interface into the optical element with total reflection in a direction toward the normal of the front side.

23 Claims, 25 Drawing Sheets

ILLUMINATION DEVICE

CROSS REFERENCE TO RELATED APPLICATIONS

This claims priority to German patent application no. 10 2022 123 050.3, filed Sep. 9, 2022, which is incorporated herein by reference.

BACKGROUND OF THE INVENTION

1. Field of the Invention

The present invention relates to an illumination device, and, more particularly, to an illumination device with a light conversion element.

2. Description of the Related Art

In laser-pumped light conversion elements, excitation light (primary radiation) is coupled into a luminescence converter. The useful light (secondary radiation) generated by photoluminescence is decoupled again, by which a light source is provided.

One example is garnet-based converters having cerium as the active element (for example, Ce:YAG, Ce:LuAG), wherein these can be operated as static converters in remission geometry with laser excitation. These converter arrangements sometimes have a particularly high luminance that can be generated. For this purpose, the converter can be irradiated, for example, using a blue laser beam (~450 nm) at high irradiance (for example >50 W/mm$^2$), due to which a part of the light is emitted as yellow light. Typical diameters of the laser beam spot can be in the range from 0.1 mm up to several millimetres. In this manner, high luminances of the yellow light can be generated. Theoretically, in a converter having an efficacy of 300 lm/W for example, a specific light emission of 15,000 lm/mm$^2$ can be achieved, which corresponds with Lambert's emission characteristic of the converters to a luminance of approximately 5000 cd/mm$^2$.

In practice, however, these luminances are not reached. The reasons for this are, on the one hand, a temperature-related reduction of the efficacy at high irradiances and furthermore the light diffusion, due to which widening of the emitted light spot occurs in particular at small diameters of the laser light spot. This is induced in particular by the index of refraction of the converter material. The high index of refraction of the converter material is problematic, since, on the one hand, it reduces the light decoupling cone due to the high critical angle of the total reflection and, on the other hand, it additionally obstructs the coupling of the blue light and the decoupling of the yellow light due to a high Fresnel reflection.

A high Fresnel reflection can be reduced by dielectric coatings on the converter, however, it is problematic in this case to reduce the interface reflection over both a broad wavelength range and a broad angle range.

What is needed in the art is to minimize light spreading of the secondary light caused by the total internal reflection at the converter surface, in particular in order to increase the achievable luminance, and to constrict a Lambert's emission characteristic of emitted light, in particular to enable an increased coupling efficiency of the light into following illumination beam paths. What is also needed in the art is to remain compatible with existing manufacturing processes and to achieve optimum matching to the optical systems in which components are used. What are also needed in the art are a high temperature stability and thus power stability, a matching of the decoupling characteristic to the optical system, improved coupling of blue light in particular and decoupling of yellow light, a possibility for matching the emission spectrum of light.

SUMMARY OF THE INVENTION

The invention relates to an illumination device including a light source for emitting primary light and a light conversion element, wherein the light conversion element is configured to be illuminated using the primary light emitted by the light source and to emit secondary light having a different wavelength on its front side. More specifically, the invention relates to an illumination device including at least one light source, designed as a laser in particular, for emitting primary light, a light conversion element having a front side, wherein the light conversion element is configured to be illuminated using the primary light emitted by the light source and to emit secondary light having a different wavelength on its front side, and an optical element, which is attached to the front side of the light conversion element such that a first optical interface is formed between the light conversion element and the optical element, so that secondary light can be coupled from the light conversion element into the optical element at the first optical interface, and wherein the optical element includes an outer surface, which forms a second optical interface to a surrounding medium, wherein (a) the outer surface includes at least one surface area B extending obliquely in relation to the front side of the light conversion element, so that secondary light can be decoupled at the second optical interface from the optical element into the surrounding medium in a direction which has a smaller angle in relation to the normal of the front side of the light conversion element than if the surface area B were to extend in parallel to the front side of the light conversion element, and/or (b), the outer surface includes at least one surface area B' extending obliquely in relation to the front side of the light conversion element, so that secondary light can be reflected at the second optical interface into the optical element, in particular with total reflection, in a direction toward the normal of the front side of the light conversion element.

The surface area B in particular faces away from the front side of the light conversion element and is used in particular as a refractive surface area. The surface area B' in particular faces toward the front side of the light conversion element and is used in particular as a reflective surface area. The optical element does not need to include both surface areas B, B'. However, in specific embodiments the optical element can include both surface areas B, B' at the same time.

The light conversion element is optionally configured to be illuminated on its front side using the primary light emitted by the light source, in particular such that the illumination device includes a remission geometry.

The optical element is optionally configured such that both the primary light and the secondary light pass through the optical element.

The outer surface of the optical element can furthermore include a surface area B" forming the primary light, which can be, for example, part of the surface area B (or a planar section A) or part of the surface area B' (or a planar section A').

The illumination device, in particular the light conversion element and/or the optical element, in particular the first optical interface, can in special cases be formed such that a part of the primary light directed onto the front side of the light conversion element extends as scattered primary light in the direction of the outer surface of the optical element, in particular such that the scattered primary light can also be decoupled from the optical element into the surrounding medium at the surface area B and/or the scattered primary light can also be reflected with total reflection at the surface area B'.

The illumination device can include a beam splitter, which is dichroic in particular, and which can be arranged both in the beam path of the primary light and in the beam path of the secondary light and can be configured to deflect one of the beam paths by reflection.

The illumination device can in some embodiments include a further optical element, which is in particular arranged downstream in the beam path, and which is configured to focus and/or collimate secondary light decoupled from the optical element.

The surface area B, at which secondary light can be decoupled from the optical element, can be formed by at least one planar section A, for example, a convexly curved planar section, of the outer surface of the optical element, which optionally extends over an angle range in relation to the normal of 0° to 20°, optionally extends over an angle range in relation to the normal of 0° to 40°, optionally extends over an angle range in relation to the normal of 0° to 70°, or extends over an angle range in relation to the normal of 0° to 90°.

The surface area B, at which secondary light can be decoupled from the optical element, can be formed by at least one planar section A, for example, a convexly curved planar section, of the outer surface of the optical element, which optionally extends over a solid angle of at least 0.45π, optionally extends over a solid angle of at least 1π, optionally extends over a solid angle of at least 2π. The solid angle designates here in particular the angle range at which the section A appears from the beam exit of the secondary light from the light conversion element.

The surface area B', at which secondary light can be reflected into the optical element with total reflection, can be formed by at least one planar section A', for example, a convexly curved planar section, of the outer surface of the optical element, which optionally extends over an angle range in relation to the normal of 1° to 90°, optionally extends over an angle range in relation to the normal of 10° to 90°, optionally extends over an angle range in relation to the normal of 40° to 90°, or extends over an angle range in relation to the normal of 60° to 90°.

The surface area B', at which secondary light can be reflected into the optical element with total reflection, can be formed by at least one planar section A', for example, a convexly curved planar section, of the outer surface of the optical element, which optionally extends over a solid angle of at least 1π, optionally extends over a solid angle of at least 1.5π, optionally extends over a solid angle of at least 1.95π.

The outer surface of the optical element and/or the planar section A of the outer surface of the optical element can be at least partially, in particular completely spherically shaped, optionally over an angle range in relation to the normal of 0° to 20°, optionally over an angle range in relation to the normal of 0° to 40°, optionally over an angle range in relation to the normal of 0° to 70°, or over an angle range in relation to the normal of 0° to 90°.

The outer surface of the optical element and/or the planar section A of the outer surface of the optical element can be at least partially, in particular completely spherically shaped, optionally over a solid angle of at least 0.45π, optionally over a solid angle of at least 1π, optionally over a solid angle of at least 2π.

The outer surface of the optical element and/or the planar section A' of the outer surface of the optical element can be at least partially parabolically shaped, optionally over an angle range in relation to the normal of 1° to 90°, optionally over an angle range in relation to the normal of 10° to 90°, optionally over an angle range in relation to the normal of 40° to 90°, or over an angle range in relation to the normal of 60° to 90°.

The outer surface of the optical element and/or the planar section A' of the outer surface of the optical element can be at least partially parabolically shaped, optionally over a solid angle of at least 1π, optionally over a solid angle of at least 1.5π, optionally over a solid angle of at least 1.95π.

The secondary light, which can be decoupled from the optical element at the surface area B, can optionally be decoupled in a direction toward the normal of the front side of the light conversion element.

The outer surface of the optical element, in particular the planar section A or the planar section A' of the outer surface of the optical element, can be designed to focus and/or collimate the secondary light and/or to restrict the angle range of the light emission.

The surface area B, at which secondary light can be decoupled from the optical element, optionally the planar section A, can be designed such that secondary light can be decoupled thereon, which can be coupled in the center of the first optical interface into the optical element.

The surface area B', at which secondary light can be reflected into the optical element with total reflection, optionally the planar section A', can be designed such that secondary light can be reflected thereon, which can be coupled in the center of the first optical interface into the optical element.

It can be provided that the optical element, in particular on its side facing toward the light conversion element, is provided at least partially, in particular completely, with a coating, in particular with a reflective dielectric or metallic coating, wherein the outer surface of the optical element, in particular only the outer surface of the optical element, is at least partially, in particular completely provided with a coating, in particular with a dielectric coating, an antireflective coating, a dichroic coating, and/or a color-shifting coating. Optionally, it can furthermore be provided that the optical element, in particular the surface area B', optionally the planar section A', includes a reflective coating.

The light conversion element can include one or more of the following materials: ceramic converter material, Ce:YAG, Ce:GYAG, in particular YAG with Gd at Y position, Ce:LuAG, Ce:GaLuAG.

The light conversion element can include polycrystalline material, in particular homogeneous polycrystalline material.

The light conversion element can include inorganic material, which can be formed in particular as a matrix material in which light-converting particles are embedded.

The light conversion element can include monocrystalline material, in particular can consist of monocrystalline material.

The light conversion element optionally has an index of refraction which is greater than 1.5 or is greater than 1.6 or is greater than 1.7 or is greater than 1.8.

The optical element can include one or more of the following materials: glass, in particular LaSF, N-LaSF9, LASF35, P-LASF51, SF glass, (all available i.a. by SCHOTT AG) or an equivalent glass.

The optical element optionally has an index of refraction which is greater than 1.5 or is greater than 1.6 or is greater than 1.7 or is greater than 1.8, in particular, is greater than the index of refraction of the light conversion element.

The index of refraction of the optical element is optionally at most 0.3 less than that of the light conversion element, optionally at most 0.1 less than that of the light conversion element, optionally at most 0.05 less than that of the light conversion element, and is particularly optionally greater than that of the light conversion element.

The optical element can consist of or include a glass such that in the range of 440 nm to 780 nm it has an internal transmittance of at least 90% measured on a 10-mm-thick sample, and/or in the range of 500 nm to 780 nm it has an internal transmittance of at least 97% measured on a 10-mm-thick sample.

The optical element can have a coefficient of thermal expansion CTE $\alpha_{+20/+300^\circ C.}$, which is in the range of 7 to $9.5\times10^{-6}$ 1/K, optionally in the range of 7 to $8.5\times10^{-6}$ 1/K.

The optical element can have a difference of the coefficient of thermal expansion CTE between the optical element and the light conversion element which, in the temperature range between 25° C. and 300° C., is less than $2\times10^{-6}$ 1/K, optionally is less than $1\times10^{-6}$ 1/K.

The optical element optionally has a glass transition temperature $T_G$, which is below 800° C., optionally is below 700° C.

Since the fusing of the optical element can take place at a viscosity $<10^{10}$ dPas, the temperature at which the glass has a viscosity of $10^{10}$ dPas is sometimes a further important parameter for the glass used for the optical element. This is optionally below 900° C., optionally below 850° C., and particularly optionally below 800° C.

The light conversion element and the optical element, in particular their materials and/or indices of refraction, are optionally designed such that a total reflection first takes place at the first interface from an angle which is greater than 50°, optionally is greater than 70°, optionally is greater than 80°.

The light conversion element and the optical element, in particular their materials and/or indices of refraction, are optionally designed such that no, or essentially no, total reflection occurs.

The optical element, in particular its material, index of refraction, and/or outer surface, are optionally designed such that a fraction of the secondary light can be decoupled from the optical element into the surrounding medium which is greater than 30%, optionally is greater than 60%, optionally is greater than 90%, in particular in relation to the luminous flux entering the optical element from the light conversion element.

The optical element, in particular its material, index of refraction, and/or outer surface are optionally designed such that all or essentially all secondary light can be decoupled from the optical element into the surrounding medium.

The present invention furthermore relates to a method for producing a light conversion device including providing a light conversion element having a front side, wherein the light conversion element is configured to be illuminated using primary light and to emit secondary light having a different wavelength on its front side, and the melting/fusing of raw material to form an optical element on the front side of the light conversion element having a first optical interface between the light conversion element and the optical element.

The raw material can at least essentially maintain its shape during the melting/fusing such that the molten optical element obtains an outer surface which at least essentially corresponds to that of the raw material.

During the melting/fusing, a temperature increase can take place such that the raw material reaches a viscosity which is higher than $10^5$ dPas and lower than $10^{10}$ dPas, optionally is higher than $10^6$ dPas and is lower than $10^8$ dPas.

During the melting/fusing, the raw material can change its shape such that the molten optical element receives an outer surface which differs from that of the raw material.

During the melting/fusing, a temperature increase can take place such that the raw material reaches a viscosity which is lower than $10^6$ dPas, optionally is lower than $10^5$ dPas, optionally is lower than $10^4$ dPas.

The outer surface of the optical element can be at least partially, in particular completely spherically shaped, optionally over a solid angle of at least ½π, optionally over a solid angle of at least π, optionally over a solid angle of at least 2π.

The outer surface of the optical element can be at least partially parabolically shaped, optionally for beams originating from the apex of the parabola in an angle range of 90° to 60° in relation to the optical axis, optionally for beams in an angle range of 90° to 30° in relation to the optical axis.

The present invention furthermore relates to a light conversion device including a light conversion element having a front side, wherein the light conversion element is configured to be illuminated using primary light and to emit secondary light having a different wavelength on its front side, and an optical element, which is attached to the front side of the light conversion element such that a first optical interface is formed between the light conversion element and the optical element, so that secondary light can be coupled from the light conversion element into the optical element at the first optical interface, and wherein the optical element includes an outer surface, which forms a second optical interface to a surrounding medium, wherein (a) the outer surface includes at least one surface area B extending obliquely to the front side of the light conversion element, so that secondary light can be decoupled at the second optical interface from the optical element into the surrounding medium in a direction which has a smaller angle in relation to the normal of the front side of the light conversion element than if the surface area B were to extend parallel to the front side of the light conversion element, and/or (b) the outer surface includes at least one surface area B' extending obliquely to the front side of the light conversion element, so that secondary light can be reflected at the second optical interface into the optical element, in particular with total reflection, in a direction toward the normal of the front side of the light conversion element.

The surface area B, at which secondary light can be decoupled from the optical element, can be formed by at least one planar section A, for example, a convexly curved planar section, of the outer surface of the optical element, which optionally extends over an angle range in relation to the normal of 0° to 20°, optionally extends over an angle range in relation to the normal of 0° to 40°, optionally extends over an angle range in relation to the normal of 0° to 70°, or extends over an angle range in relation to the normal of 0° to 90°.

The surface area B, at which secondary light can be decoupled from the optical element, can be formed by at least one planar section A, for example, a convexly curved planar section, of the outer surface of the optical element, which optionally extends over a solid angle of at least 0.45π, optionally extends over a solid angle of at least 1π, optionally extends over a solid angle of at least 2π.

The surface area B', at which secondary light can be reflected into the optical element with total reflection, can be formed by at least one planar section A', for example, a convexly curved planar section, of the outer surface of the optical element, which optionally extends over an angle range in relation to the normal of 1° to 90°, optionally extends over an angle range in relation to the normal of 10° to 90°, optionally extends over an angle range in relation to the normal of 40° to 90°, or extends over an angle range in relation to the normal of 60° to 90°.

The surface area B', at which secondary light can be reflected into the optical element with total reflection, can be formed by at least one planar section A', for example, a convexly curved planar section, of the outer surface of the optical element, which optionally extends over a solid angle of at least 1π, optionally extends over a solid angle of at least 1.5π, optionally extends over a solid angle of at least 1.95π.

The outer surface of the optical element and/or the planar section A of the outer surface of the optical element can be at least partially, in particular completely spherically shaped, optionally over an angle range in relation to the normal of 0° to 20°, optionally over an angle range in relation to the normal of 0° to 40°, optionally over an angle range in relation to the normal of 0° to 70°, or over an angle range in relation to the normal of 0° to 90°.

The outer surface of the optical element and/or the planar section A of the outer surface of the optical element can be at least partially, in particular completely spherically shaped, optionally over a solid angle of at least 0.45π, optionally over a solid angle of at least 1π, optionally over a solid angle of at least 2π.

The outer surface of the optical element and/or the planar section A' of the outer surface of the optical element can be at least partially parabolically shaped, optionally over an angle range in relation to the normal of 1° to 90°, optionally over an angle range in relation to the normal of 10° to 90°, optionally over an angle range in relation to the normal of 40° to 90°, or over an angle range in relation to the normal of 60° to 90°.

The outer surface of the optical element and/or the planar section A' of the outer surface of the optical element can be at least partially parabolically shaped, optionally over a solid angle of at least 1π, optionally over a solid angle of at least 1.5π, optionally over a solid angle of at least 1.95π.

The secondary light, which can be decoupled from the optical element at the surface area B, can optionally be able to be decoupled in a direction toward the normal of the front side of the light conversion element.

The outer surface of the optical element, in particular the planar section A or the planar section A' of the outer surface of the optical element, can be designed to focus and/or collimate the secondary light and/or to restrict the angle range of the light emission.

The surface area B, at which secondary light can be decoupled from the optical element, optionally the planar section A, can be designed such that secondary light can be decoupled thereon, which can be coupled in the center of the first optical interface into the optical element.

The surface area B', at which secondary light can be reflected into the optical element with total reflection, optionally the planar section A', can be designed such that secondary light can be reflected thereon, which can be coupled in the center of the first optical interface into the optical element.

It can be provided that the optical element, in particular on its side facing toward the light conversion element, is provided at least partially, in particular completely, with a coating, in particular with a reflective dielectric or metallic coating, wherein the outer surface of the optical element, in particular only the outer surface of the optical element, is at least partially, in particular completely provided with a coating, in particular with a dielectric coating, an antireflective coating, a dichroic coating, and/or a color-shifting coating. Optionally, it can furthermore be provided that the optical element, in particular the surface area B', optionally the planar section A', includes a reflective coating.

The light conversion element can include one or more of the following materials: ceramic converter material, Ce:YAG, Ce:GYAG, in particular YAG with Gd at Y position, Ce:LuAG, Ce:GaLuAG.

The light conversion element can include polycrystalline material, in particular homogeneous polycrystalline material.

The light conversion element can include inorganic material, which can be formed in particular as a matrix material in which light-converting particles are embedded.

The light conversion element can include monocrystalline material, in particular can consist of monocrystalline material.

The light conversion element optionally has an index of refraction which is greater than 1.5 or is greater than 1.6 or is greater than 1.7 or is greater than 1.8.

The optical element can include one or more of the following materials: glass, in particular LaSF, N—LaSF9, LASF35, P-LASF51, SF glass, or an equivalent glass.

The optical element optionally has an index of refraction which is greater than 1.5 or is greater than 1.6 or is greater than 1.7 or is greater than 1.8, in particular is greater than the index of refraction of the light conversion element.

The index of refraction of the optical element is optionally at most 0.3 less than that of the light conversion element, optionally at most 0.1 less than that of the light conversion element, optionally at most 0.05 less than that of the light conversion element, and is optionally greater than that of the light conversion element.

The optical element can consist of or include a glass such that in the range of 440 nm to 780 nm, it has an internal transmittance of at least 90% measured on a 10-mm-thick sample and/or in the range of 500 nm to 780 nm, it has an internal transmittance of at least 97% measured on a 10-mm-thick sample.

The optical element can have a coefficient of thermal expansion CTE or a measured in the range (+20/+300° C.), which is in the range of 7 to $9.5\times10^{-6}$ 1/K, optionally is in the range of 7 to $8.5\times10^{-6}$ 1/K.

The optical element can have a difference of the coefficient of thermal expansion CTE between the optical element and the light conversion element which, in the temperature range between 25° C. and 300° C., is less than $2\times10^{-6}$ 1/K, optionally is less than $1\times10^{-6}$ 1/K.

The optical element optionally has a glass transition temperature $T_G$, which is below 800° C., optionally is below 700° C.

Since the fusing of the optical element can take place at a viscosity $<10^{10}$ dPas, the temperature at which the glass has a viscosity of $10^{10}$ dPas is sometimes a further important parameter for the glass used for the optical element. This is optionally below 900° C., optionally below 850° C., and optionally below 800° C.

The light conversion element and the optical element, in particular their materials and/or indices of refraction, are optionally designed such that a total reflection first takes place at the first interface from an angle which is greater than 50°, optionally is greater than 70°, optionally is greater than 80°.

The light conversion element and the optical element, in particular their materials and/or indices of refraction, are optionally designed such that no, or essentially no, total reflection occurs.

The optical element, in particular its material, index of refraction, and/or outer surface, are optionally designed such that a fraction of the secondary light can be decoupled from the optical element into the surrounding medium which is greater than 30%, optionally is greater than 60%, optionally is greater than 90%, in particular in relation to the luminous flux entering the optical element from the light conversion element.

The optical element, in particular its material, index of refraction, and/or outer surface are optionally designed such that all or essentially all secondary light can be decoupled from the optical element into the surrounding medium.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 1:
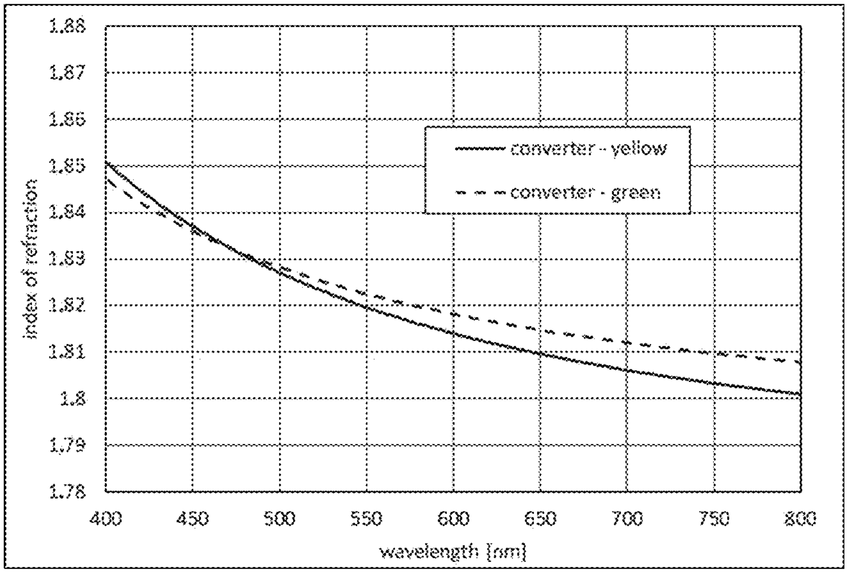
FIG. 1 shows a graph of the index of refraction of ceramic converters.

FIG. 1 shows an example of the index of refraction of typical ceramic converters. The index of refraction profile is shown here as a function of the wavelength for a yellow-emitting converter made of YAG and a green-emitting converter made of LuAG. In both cases, the index of refraction in the visible spectral range is above n=1.8. At 555 nm, the wavelength of maximum ocular sensitivity, the index of refraction is approximately n=1.82.

Figure 2A:
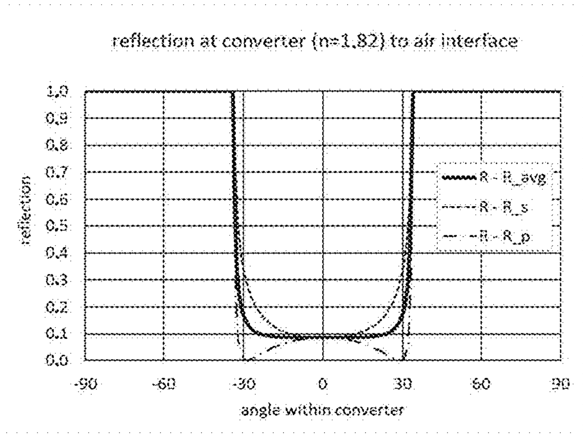
FIGS. 2A and 2B shows graphs of the reflection at the interface between converter and another optical medium.

The reflection of light at the interface between converter and another optical medium having an index of refraction is described by the Fresnel formula. The reflectance calculated therefrom for light, which exits from a converter having the index of refraction $n_c$=1.82 at a given angle α at the interface to air, is shown in FIG. 2A. The angle (α) designates in this case the angle between light beam and surface normal. With perpendicular incidence (α=0°), 8.5% of the light is reflected back into the converter, the majority (91.5%) is transmitted. At large angles (α>33.3°), the light suffers total internal reflection (TIR): the reflectance is 100%. The critical angle of the total reflection γ at the interface between the optically denser medium of the converter having the index of refraction n c and the adjoining optically thinner medium n g is given by $$\gamma = \alpha_{TIR} = \arcsin\left(\frac{n_g}{n_c}\right).$$

Between perpendicular incidence (α=0°) and the critical angle of the total reflection (α=γ), the reflectance is dependent on whether the light is polarized parallel (p) or perpendicular to the plane of incidence (s). In the case that the light generated in a luminescence converter is unpolarized, i.e., contains both polarization directions in equal parts, the reflection shown by bold lines in FIG. 2A, which is averaged from s and p polarization, is decisive, which first has a significant angle dependence in the vicinity of the TIR critical angle.

Figure 2B:
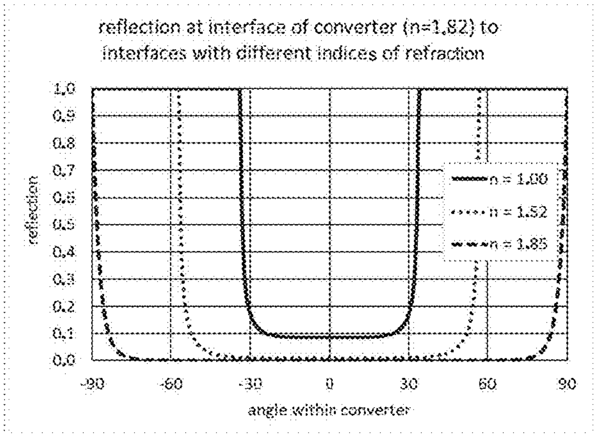

In FIG. 2B, this reflectance is shown for unpolarized light for interfaces of the converter to other optical media. For typical optical glass (n=1.52), the Fresnel reflection for perpendicular incidence sinks significantly to only 0.8%, and the critical angle for total reflection rises to 56.6°. In a medium having identical index of refraction, the Fresnel reflection is 0% for all angles, and in a medium having somewhat higher index of refraction, the Fresnel reflection is no longer negligible only at angles above 70°. However, total internal reflection does not occur.

Figure 3:
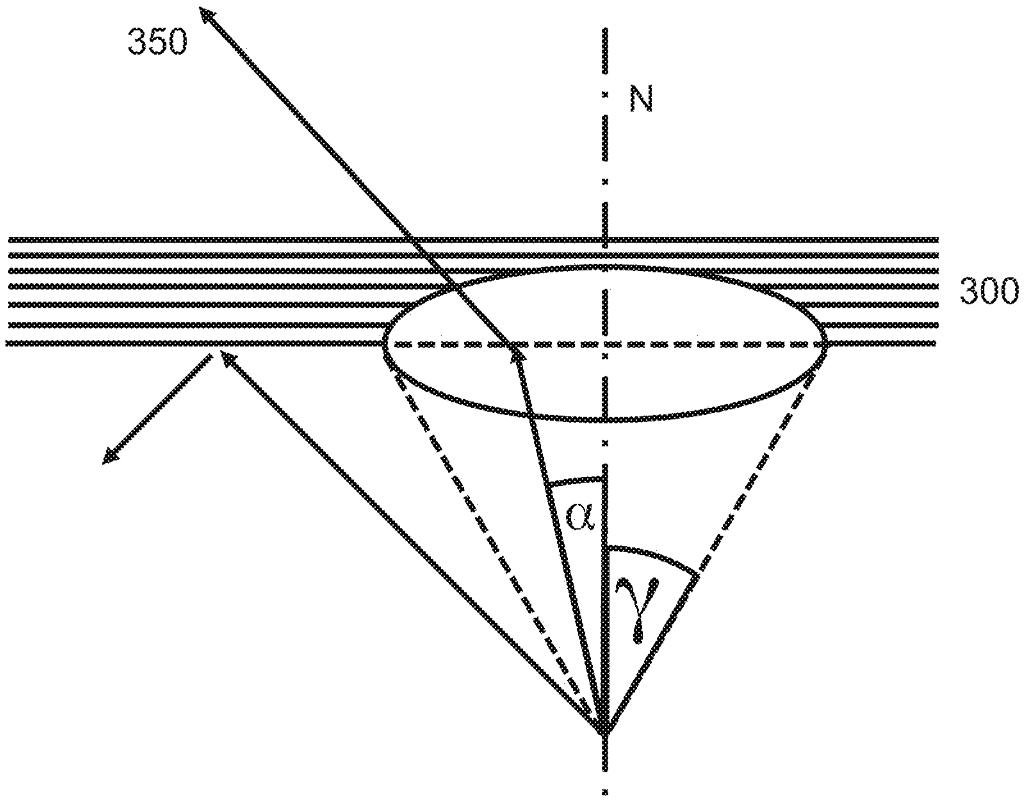
FIG. 3 shows a schematic diagram of an escape cone.

FIG. 3 illustrates the escape cone. The critical angle of the total reflection defines this escape cone for an imaginary light spot in the converter medium. Light beams within this cone do not suffer total reflection, light beams outside this cone suffer total reflection and cannot leave the material or can only leave it after further scattering or reflection events within a converter plate.

The solid angle which the escape cone covers is $$\Omega = 2\pi(1-\cos(\gamma))$$

The fraction of the light which is emitted into a half space (W=2p) of the converter and which then lies in the escape cone is thus $$F_{EC} = 1-\cos(\gamma)$$

However, not all light in the escape cone will leave the converter, since the interface reflection given by the Fresnel formula also has to be taken into consideration. Since this can be estimated well by the interface reflection with perpendicular incidence, this fraction is approximately:

$$F_{Decoupling} = [1-\cos(\gamma)][1-R_F(0)]$$

The fraction complementary to FEE, which suffers total internal reflection, is given by $$F_{TIR} = \cos(\gamma) = \cos\left(\arcsin\left(\frac{n_g}{n_c}\right)\right)$$

Figure 4:
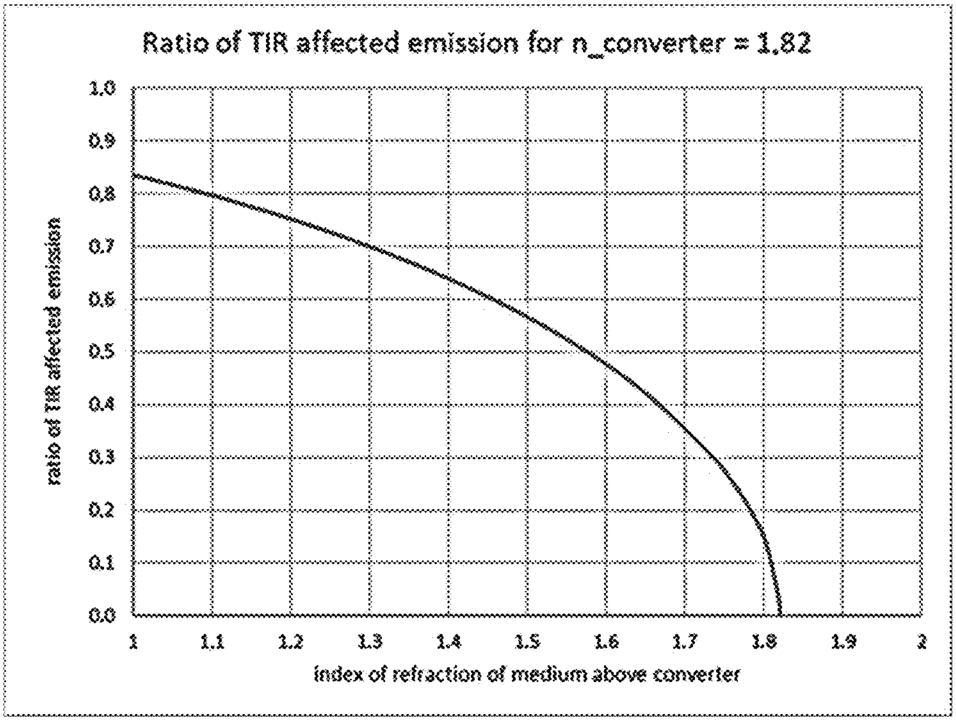
FIG. 4 shows a graph of the fraction of the emission which suffers total internal reflection.

FIG. 4 shows this function for a converter index of refraction of 1.82 and shows that the fraction of the light blocked by total internal reflection will be very sensitively dependent on the index of refraction of the decoupling medium. If the index of refraction of the decoupling medium is greater than that of the converter material, no total internal reflection thus takes place.

Values for the Fresnel reflection with perpendicular incidence $R_F(0°)$, the critical angle of the total reflection Tim, the fraction of the light in the escape cone FEE, and the estimation for the fraction of the directly exiting light $F_{Decoupling}$ are compiled for selected interface situations in the following table.

| Interface | converter/ air | converter/ glass (n = 1.52) | converter/ high index glass index matched (n = 1.82) | converter/ high index glass (n = 1.85) |
|---|---|---|---|---|
| nc | 1.82 | 1.82 | 1.82 | 1.82 |
| ng | 1.00 | 1.52 | 1.82 | 1.85 |
| RF(0°) | 0.085 | 0.008 | — | 6.68E−05 |
| gamma_TIR | 33.3 | 56.6 | — | — |
| Escape Cone Fraction F_EC | 0.164 | 0.450 | — | — |
| F_EC * (1 − RF(0°)) | 0.151 | 0.446 | — | — |

Figure 5:
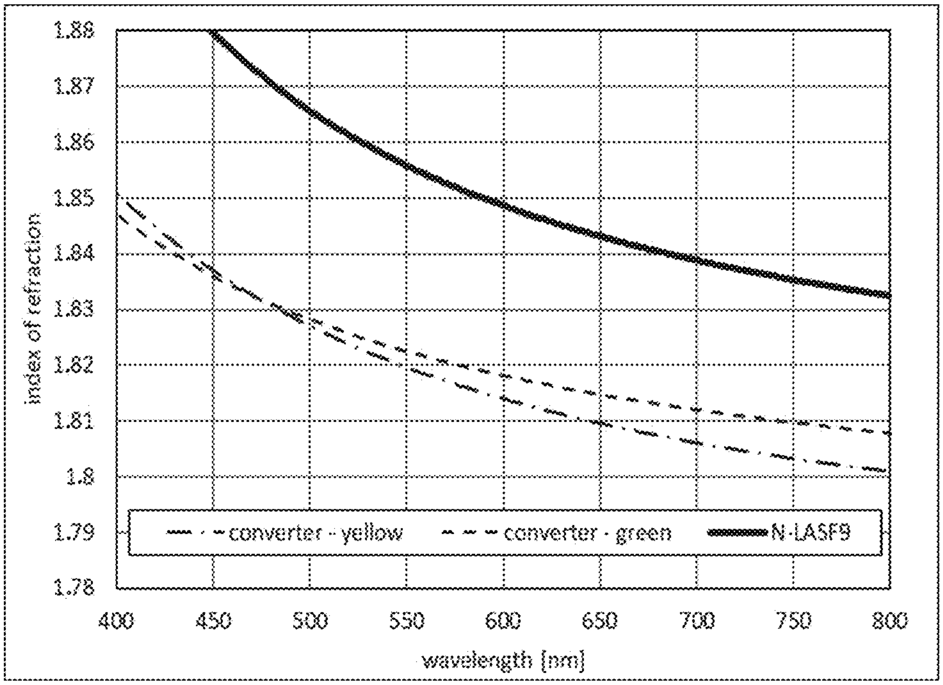
FIG. 5 shows a graph of the index of refraction of ceramic converters in comparison to glass N-LASF9.

FIG. 5 shows an example of the wavelength-dependent index of refraction profile of a highly refractive glass in comparison to ceramic converters. The glass N-LASF9 is shown here, which has a higher index of refraction than the illustrated ceramic converters in the entire visible spectrum.

Figure 6A:
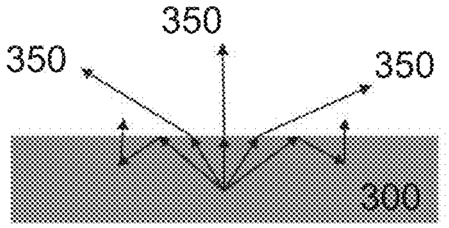
FIGS. 6A, 6B, 7, 8, 9, 10, 11, 12, 13, 14, 15, 16, 17, 18, and 19 show schematic diagrams of exemplary embodiments for light conversion devices or illumination devices.

FIG. 6A shows a light conversion element 300. In luminescence converters, incident light of the excitation wavelength (for example blue light at 450 nm) is absorbed, and the conversion centers (for example, Cer in YAG or LuAG) emit light of lower energy or longer wavelength. In a completely transparent luminescence converter, this light would be guided in a large fraction $F_{TI}$ by total internal reflection in the converter and would thus be captured in the converter.

To prevent this, luminescence converters are typically provided with scattering centers, which result in a change of the light propagation direction and thus increase the exiting light fraction. Since this only takes place after scattering events, however, the decoupled light spot is enlarged in relation to the incident light spot. This therefore reduces the achievable luminance.

The scattering can be volume scattering, or also surface scattering. Volume scattering is induced, for example by inhomogeneities in the volume of polycrystalline ceramic converters. Surface scattering is caused by a rough or structured surface. In transparent monocrystalline converter material, this is typically the only option for limiting the lateral light propagation by scattering.

Figure 6B:
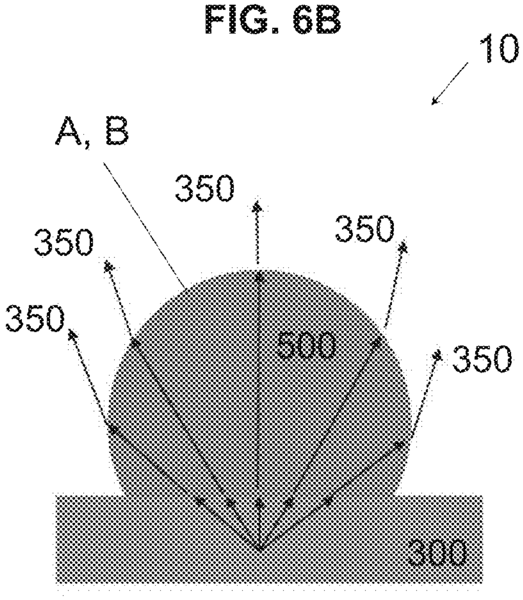

FIG. 6B shows a light conversion device 10 having a ball lens 500 applied to the light conversion element 300. With a ball lens on the converter, the total internal reflection is reduced or eliminated entirely. The light can therefore enter the ball lens from the converter without or with only minor losses. Since the angle of incidence on the spherical ball surface is reduced, the light suffers total internal reflection there not at all or only for a significantly smaller fraction of the light beams. The fraction of the directly decoupled light can thus be increased, which in particular increases the achievable luminance. It is noteworthy that the index of refraction jump takes place directly at the interface. In particular, there are no air gaps.

Figure 7:
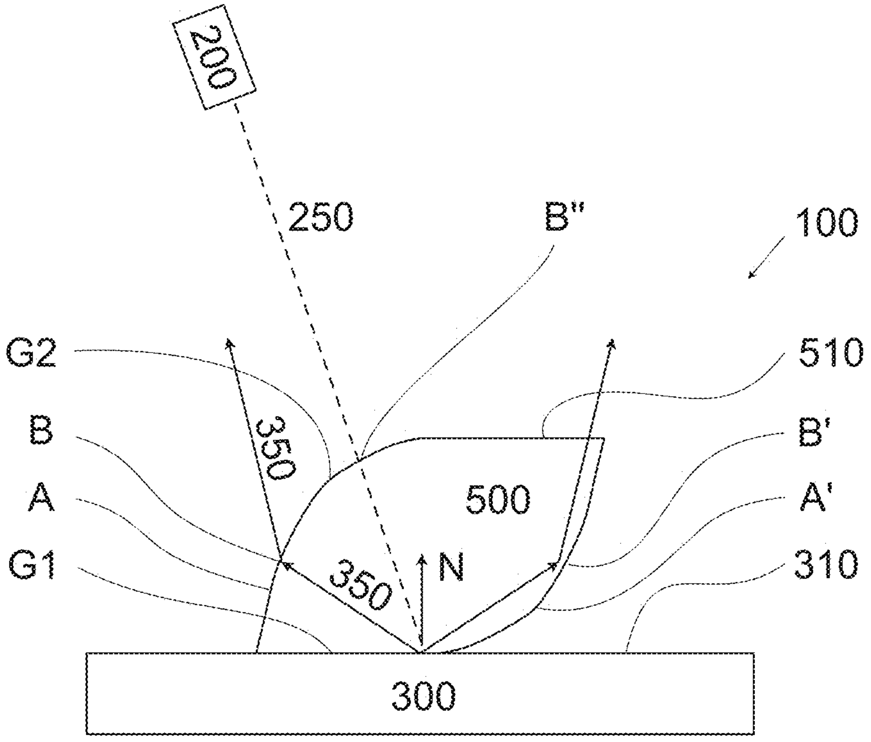

FIG. 7 shows an exemplary embodiment of an illumination device 100, which includes in each case a light source 200 designed as a laser, which is configured to emit primary light 250 onto the front side 310 of a light conversion element 300, wherein the light conversion element 300 is configured as a result to emit secondary light 350 having a different wavelength on its front side 310.

An optical element 500 is in turn applied to the front side 310 of the light conversion element 300, wherein an optical contact exists between the light conversion element 300 and the optical element 500, i.e., a first optical interface G1 is formed between the light conversion element 300 and the optical element 500. At this first optical interface G1, secondary light 350 can be coupled from the light conversion element 300 into the optical element 500.

The optical element 500 moreover includes an outer surface 510, which forms a second optical interface G2 to a surrounding medium. The outer surface 510 includes different sections A, A' and areas B, B'.

Within a planar section A extending in a curve, a surface area B extending obliquely to the front side 310 of the light conversion element 300 is located, which faces away from the front side 310. This surface area B is characterized in that secondary light 350 can be decoupled at the second optical interface G2 from the optical element 500 into the surrounding medium in a direction which has a smaller angle in relation to the normal N of the front side 310 of the light conversion element 300 than if the surface area B were to extend in parallel to the front side 310 of the light conversion element 300. In particular, in this example the secondary light 350 is refracted at the surface area B in the direction of the normal N.

Within a further planar section A' extending in a curve, a further surface area B' extending obliquely to the front side 310 of the light conversion element 300 is located, which faces toward the front side 310. This surface area B' is characterized in that secondary light 350 is reflected at the second optical interface G2 in the optical element 500 with total reflection in a direction toward the normal N of the front side 310 of the light conversion element 300. The surface area B' can optionally include a reflective coating.

The outer surface 510 of the optical element 500 moreover includes a surface area B" at which the primary light 250 is coupled into the optical element 500. This surface area B" can also be formed as a beamforming area, in particular to change the beam form or beam direction of the primary beam, e.g. with regard to more suitable irradiation of the light conversion element 300.

Figure 8:
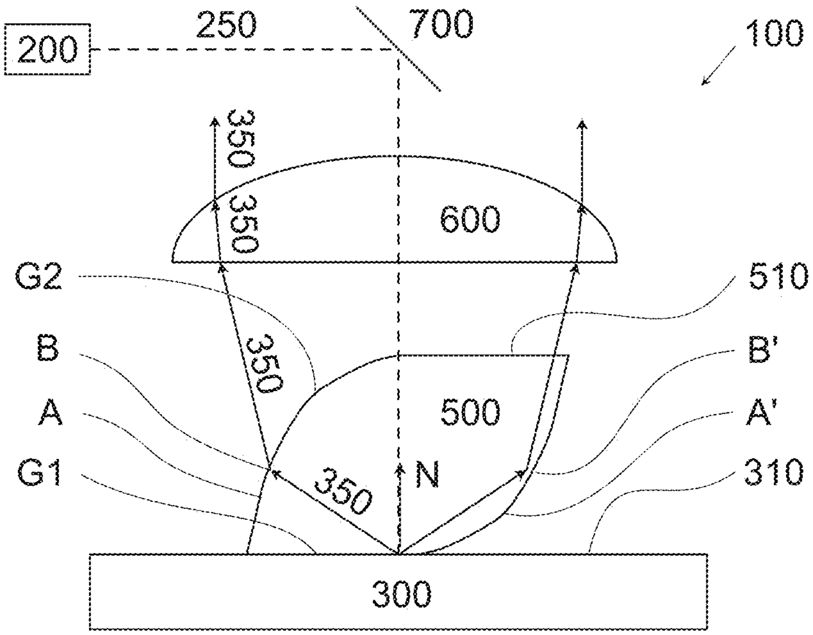

FIG. 8 shows a further exemplary embodiment of an illumination device 100, which is similar in some aspects to the exemplary embodiment of FIG. 1. This example additionally includes a beam splitter 700, which deflects the incident primary light in order to guide it onto the front side 310 of the light conversion element 300. Furthermore, this example includes a further optical element 600, which is configured to focus or collimate secondary light 350 decoupled from the optical element 500.

Figure 9:
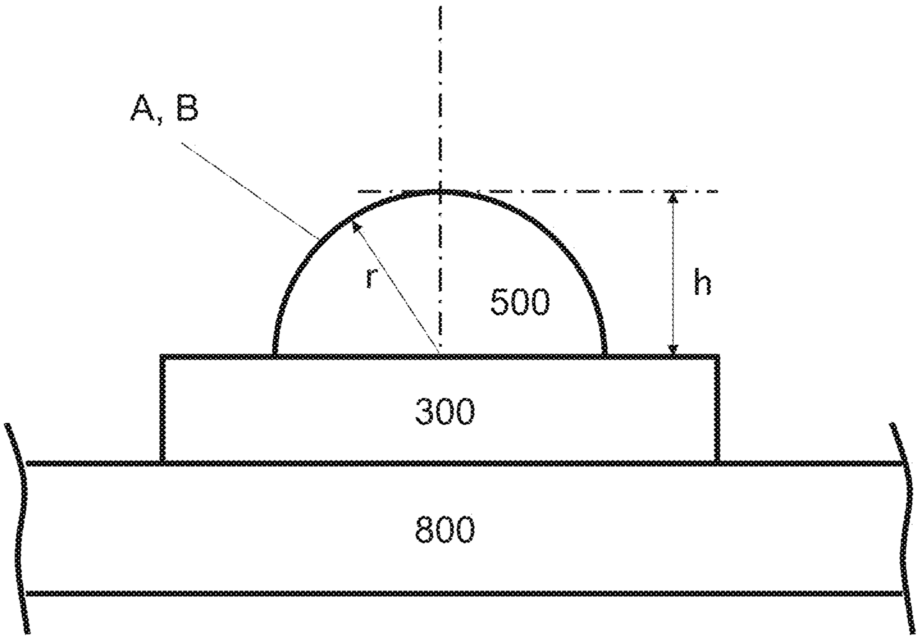

FIG. 9 shows an exemplary embodiment having an optical element 500 designed as a hemisphere ball lens. The apex height h is equal to the ball radius r here. With ideal index of refraction matching, the total internal reflection is suppressed at the converter-glass interface, and the light beams from the center of the hemisphere can leave the lens without direction change. As shown, the light conversion element 300, i.e., the converter, is optionally arranged on a thermal spreader 800.

Figure 10:
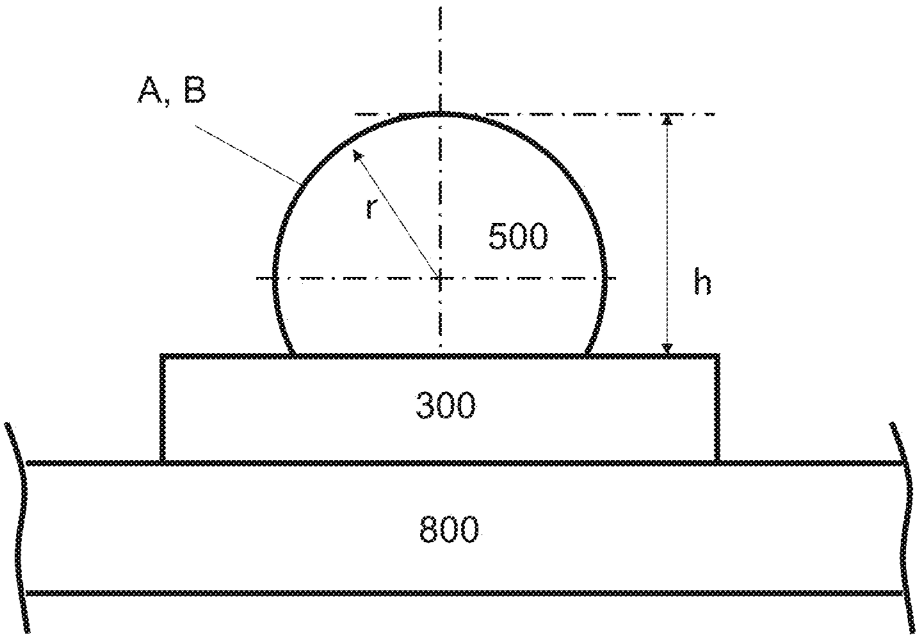

FIG. 10 shows an exemplary embodiment having an optical element 500 designed as a ball lens, wherein the apex height h is greater than the ball radius r. Light which leaves the converter is thus refracted toward the optical axis and the light bundle thus becomes less divergent and more strongly collimated. In the extreme case of a ball lens having the index of refraction n=2, in which the apex height corresponds to the diameter, there is even perfect collimation of beams close to the axis. However, there are then also light fractions here which suffer total internal reflection inside the ball lens, so that the decoupling efficiency is limited.

Figure 11:
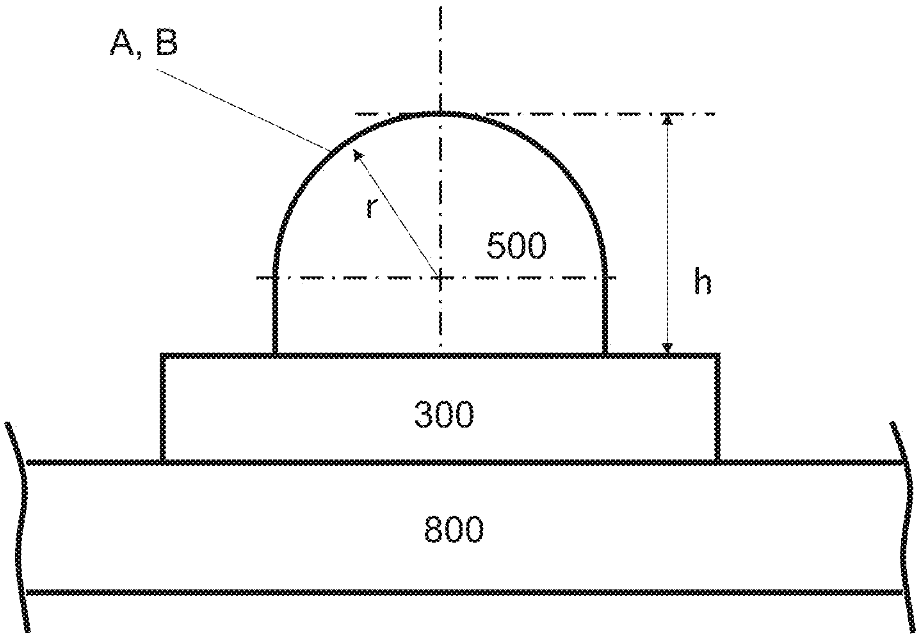

FIG. 11 shows an exemplary embodiment having an optical element 500, which deviates from a spherical shape. This shape deviation can be caused, for example, by mechanical or optical requirements, possibly also can result from the manufacturing method and/or from manufacturing errors. Since the outer surface of the optical element is still partially spherical, however, the action principle of a ball lens described here also applies.

Figure 12:
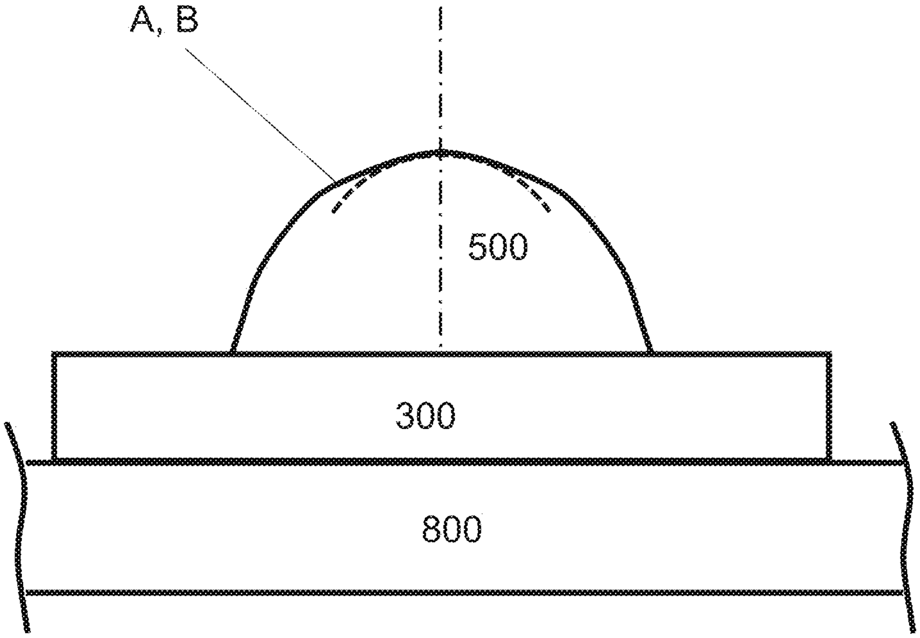

FIG. 12 shows an exemplary embodiment having an optical element 500, which is formed as an asphere. Aspheres are sometimes used in illumination optics, if large numeric apertures are necessary to couple in the light from light sources having large emission angles having a high numeric aperture and to limit the aperture error of the lenses.

Figure 13:
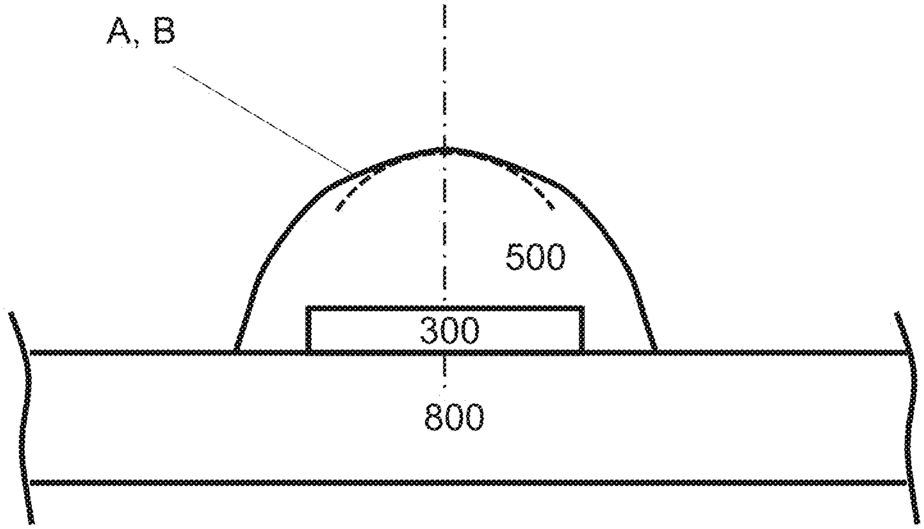

FIG. 13 shows an exemplary embodiment having an optical element 500 which completely covers the front side 310 of the light conversion element 300. Moreover, it can be provided that the optical element 500 also encloses lateral faces of the light conversion element 300, for example, such that the light conversion element 300 is completely enclosed by the optical element 500 and a thermal spreader 800. Of course, this option of a light conversion element 300 enclosed by the optical element 500 also applies independently of the shape of the optical element 500.

Figure 14:
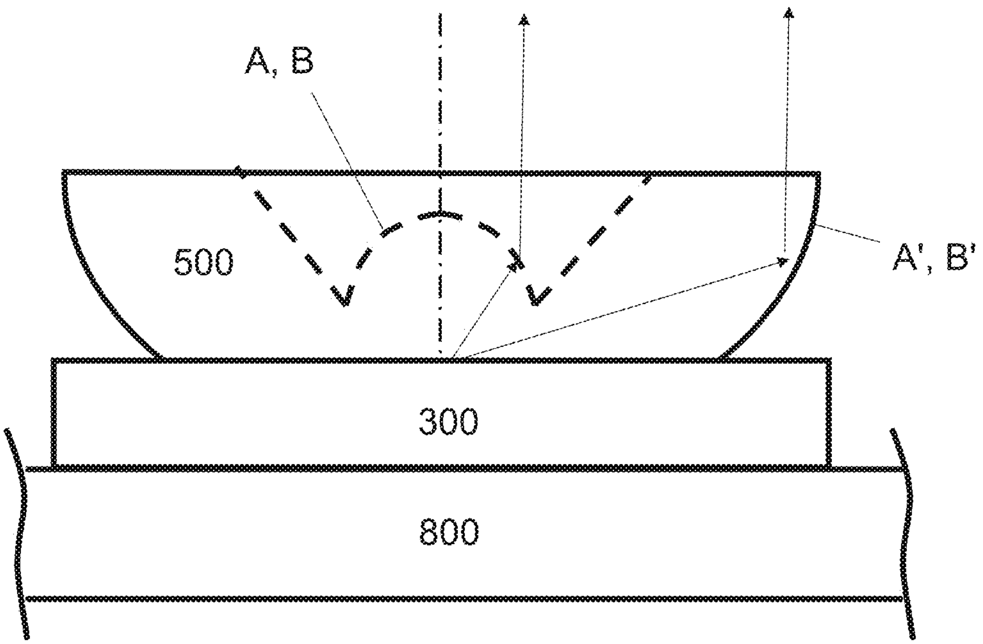

FIG. 14 shows an exemplary embodiment having an optical element 500 applied to a light conversion element 300, which is formed as a free-form optical unit. The total internal reflection (at an area B') in the optical element is utilized here for light beams which are emitted at a large angle in order to also collimate such beams and thus increase the decoupling efficiency, while light beams having a smaller angle are reflectively decoupled at an area B.

Figure 15:
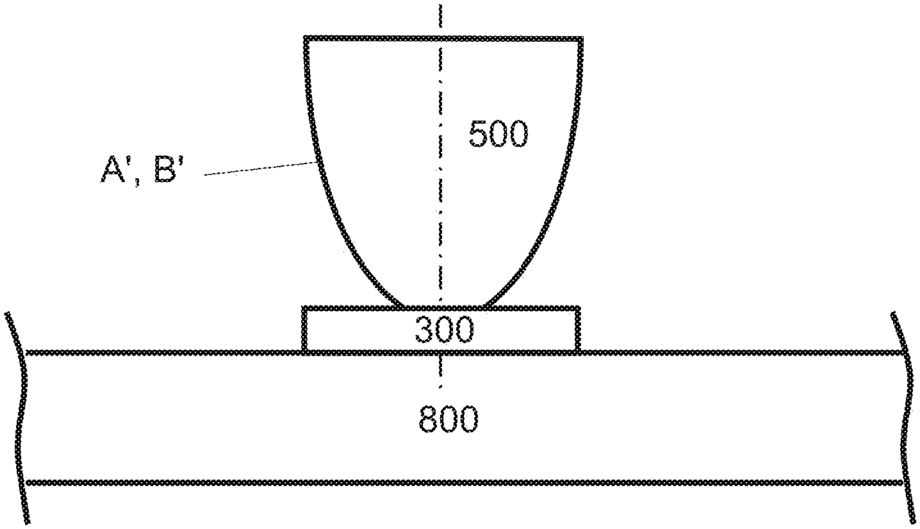

FIG. 15 shows an exemplary embodiment having an optical element 500 designed as a parabolic light guide rod, wherein the light guide rod is in turn applied directly to the converter. Since it acts like a parabolic reflector for the converted light due to TIR, a collimation of the light emitted by the converter is also hereby possible.

Figure 16:
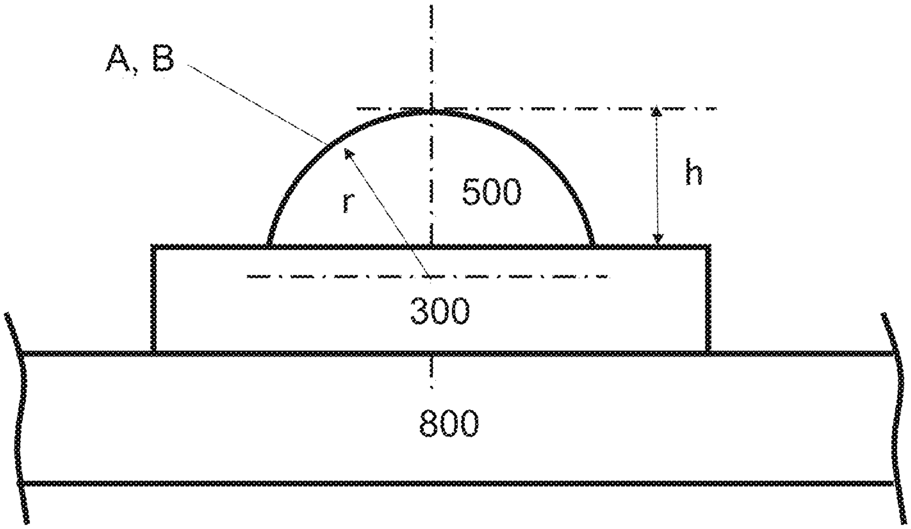

FIG. 16 shows an exemplary embodiment having an optical element 500, which is designed as a flat lens in which the apex height h is less than the radius r. With glass indices of refraction which are less than the converter index of refraction, this lens shape can have a theoretical decoupling efficiency <1. However, advantages nonetheless result in relation to the planar interface without ball lens.

Figure 17:
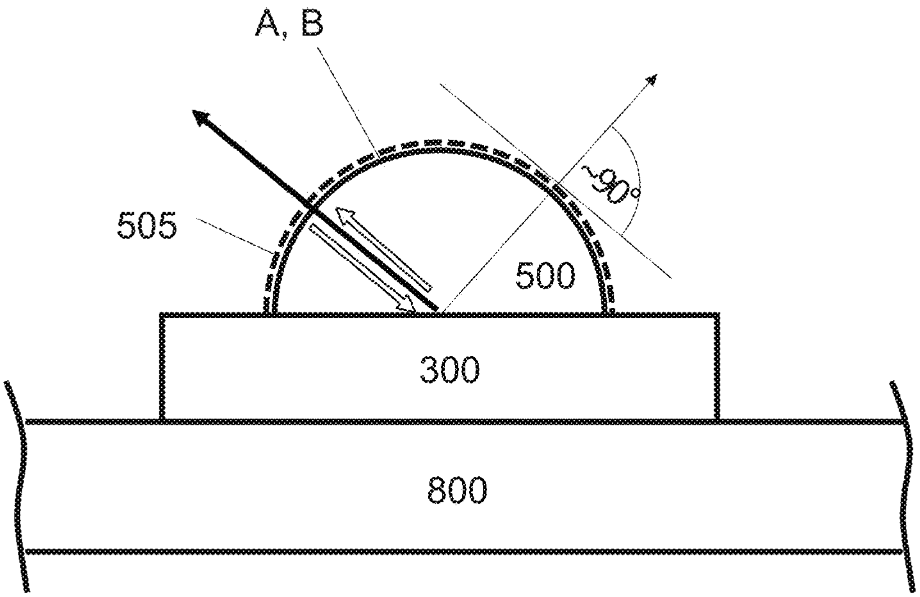

FIG. 17 shows an exemplary embodiment having an optical element 500, for example, a hemispherical ball lens, wherein the optical element 500 includes a coating 505, for example an applied optical layer system (coating). In particular, antireflective coatings (AR coatings) are expedient in order to minimize the Fresnel reflection between the highly refractive glass and the air. It is advantageous that the angle spectrum of the exiting light is less than is the case with direct exit of light from the converter. Particularly efficient coatings can thus be applied. With a hemisphere, the light beams are incident, for example, nearly perpendicularly on the coating, so that here, for example, AR coatings having large spectral bandwidth and low residual reflection can be applied. However, coatings having specific spectral profiles are also conceivable, which influence the emission spectrum of the converter. Thus, for example, a dielectric long pass filter could shift the emission spectrum of a yellow converter toward red emission: the shortwave fraction of the emission would be reflected back to the emission spot again, would be absorbed there, and would be reemitted with a longer wavelength after renewed conversion. Of course, a coating can also be provided in all other exemplary embodiments.

Figure 18:
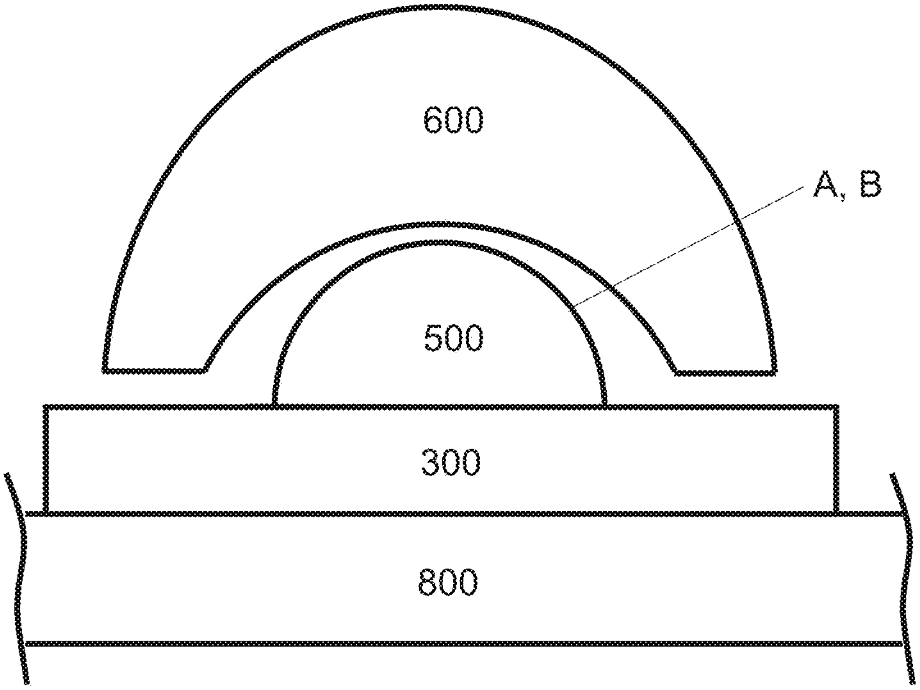

FIG. 18 shows an exemplary embodiment having an optical element 500, in this example in the form of a ball lens, in combination with a further downstream optical element 600, in this example a downstream high aperture lens. In particular with hemispherical ball lenses, which have no collimating effect but a potentially high coupling efficiency, this combination is advantageous to thus achieve collimation nonetheless. However, it is to be noted that it can be difficult due to the index of refraction dispersion in the optical elements to optimize the beam path for both blue and yellow light. This can be countered by splitting the beam paths.

Figure 19:
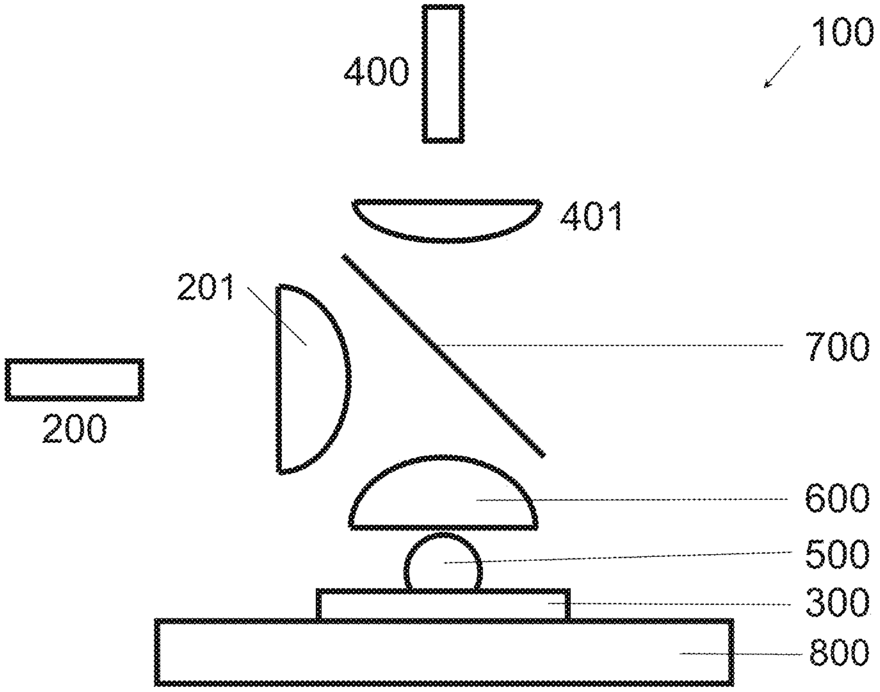

FIG. 19 shows an exemplary embodiment of an illumination device 100, wherein the beam path of the blue laser light and yellow useful light is separated by a dichroic beam splitter 700. The ball lens 500 and possibly collimation lenses 600 combined therewith are used here by both beam paths. The collimation lens 201 behind the blue excitation laser 200 and the converging lens 401 in front of the entry to the system 400 to be illuminated (for example, a homogenizing rod) each only have one beam path radiating through them, however, and can thus be optimized separately. Such an exemplary embodiment can be used, for example, in projection applications.

The following FIGS. 20 to 25 relate in particular to method aspects for producing a light conversion device.

Light conversion elements 300 having applied optical element 500 were experimentally implemented, for example, by: (1.) Melting glass onto converter material, due to which lens forms result solely due to the surface tension of the molten glass; (2.) Melting of ball lenses which are partially ground on one side; (3.) Melting of prisms, in particular to prove the optical contact and determine optimum melting conditions; (4.), Melting of ball lenses onto converters with rear-side silver metallization, in particular with the result that the subsequent melting of the ball lenses does not destroy the silver metallization.

A light conversion device can be produced, for example, via a melting process which enables a direct connection of the glass to the converter material. The glass element to be fused on is placed on the converter and subjected to a temperature treatment. In principle, an additional surface conditioning is not required for both components (glass and converter material); a prior cleaning is optional.

The selection of the temperature program takes place in consideration of the physicochemical properties of the glass, in particular the viscosity-temperature profile, the interface tension, the crystallization properties, and the thermal expansion (or CTE mismatch between glass and converter material).

Highly refractive glasses, as are used for the desired arrangement, represent a special challenge to the fusing process, since they often have steep viscosity curves and tend toward crystallization (in particular toward surface crystallization). The process window available is therefore small.

To obtain an intimate bond between glass and converter material, the viscosity falls below a specific limiting viscosity (or a limiting temperature is exceeded), for example, in the order of magnitude of $10^{10}$ dPas. The bond optionally provides not only mechanical stability, but also an attachment which is "optically homogeneous" over the entire surface, i.e., optionally no local air inclusions or the like are present at the interface between glass and converter.

Furthermore, a crystallization (for example in the bulk and/or at the surface) is optionally avoided, since it can reduce the transmission of the optical element, for example, or causes undesired scattering of the exiting or entering light.

The shape or contour of the optical glass element can be influenced in different ways in order to obtain a desired shape or contour: (a) The contour can be specified via a "preform" (cold glass part before fusing) and is not changed during the fusing process (at least in the optically relevant area). The surface quality of the preform is also (at least) retained during the fusing, wherein in particular with rough surfaces an improvement of the surface quality is possible in the melting process. (b) The contour of the preform is different than that of the optical element. The final contour first arises in the course of the fusing process.

In the case (a), the preform is, for example, a glass ball flattened on one side or halved. In the case (b), the preform can be, for example, a cubical element. However, other shapes are also conceivable. The surface quality of the preform can deviate in this case from that of the optical element to be formed or can also be worse. Worse is to be understood to mean: the parameters typical for characterizing surface quality, such as roughness parameter values $R_a$, $R_q$ or $S_a$, $S_q$, etc. can be higher. Which of the options is selected is dependent not only on the contour of the optical element to be achieved, but is also influenced by the selection of the glass material. The temperature guides for the two variants typically differ.

In case (a), the fusing process optionally takes place in the range which corresponds to viscosities between $10^{10}$ dPas and $10^7$ dPa. In case (b), the fusing optionally takes place at temperatures below a viscosity of $10^7$ dPas. In this case, the shape of the optical element forms via the surface tension of the glass. However, this is obstructed by low crystallization temperatures or high crystal growth speeds. The maximum temperature in the fusing process optionally remains below a critical temperature threshold value for this purpose, or a specific temperature threshold value is only exceeded for a short time. Beginning crystallization at the glass surface results in the occurrence of scattering centers, on the one hand, directly due to the crystallite itself and also indirectly due to a wrinkled rough surface skin forming in the cooling process due to different coefficients of expansion of crystals and glass.

Exemplary Embodiment 1 for Option (a) Fusing Method

Glass type: N—LaSF9, index of refraction $n_D$ 1.85; $10^{7.6}$ dPas at 817° C., $10^{13}$ dPas at 700° C.; crystallization: LDB lower devitrification boundary measured using gradient rod method is approximately 900° C. corresponding to approximately $10^{5.5}$ dPas. Converter underlay: silver-coated Ce/YAG. Contour preform: hemisphere, surface quality preform (measurement data white light interferometry WLI, measurement field 336*336 μm$^2$: $S_g$ 5 nm, $S_a$ 4 nm).

Method steps: cleaning the preform(s); cleaning the converter(s); laying the preform(s) on the converter underlay(s); clean furnace chamber, advantageous: inner sleeve in the furnace due to cleanness and to improve the temperature homogeneity, advantageous: separate cover of the arrangement made up of lens(es) and converter(s) with ceramic vessel.

Temperature program: 3 K/min to 825° C., 15 min hold, cooling at 1 K/min to 700° C., then "free" cooling.

Figure 20:
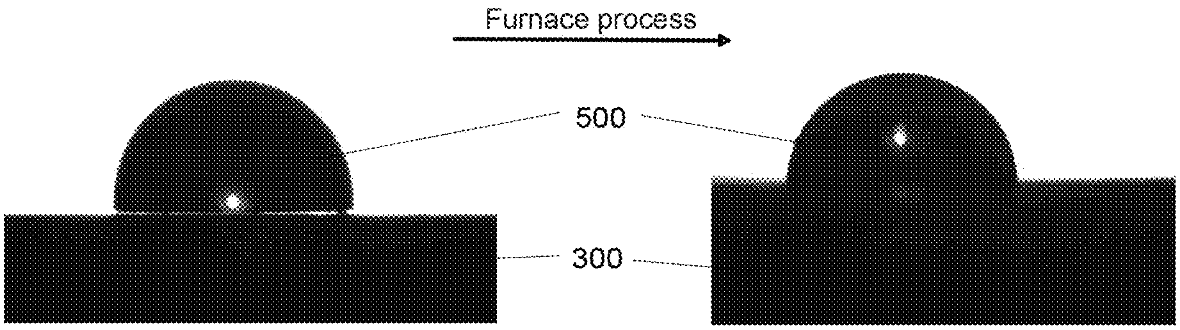
FIGS. 20 and 21 show experimental results of a fusing method.
Figure 21:
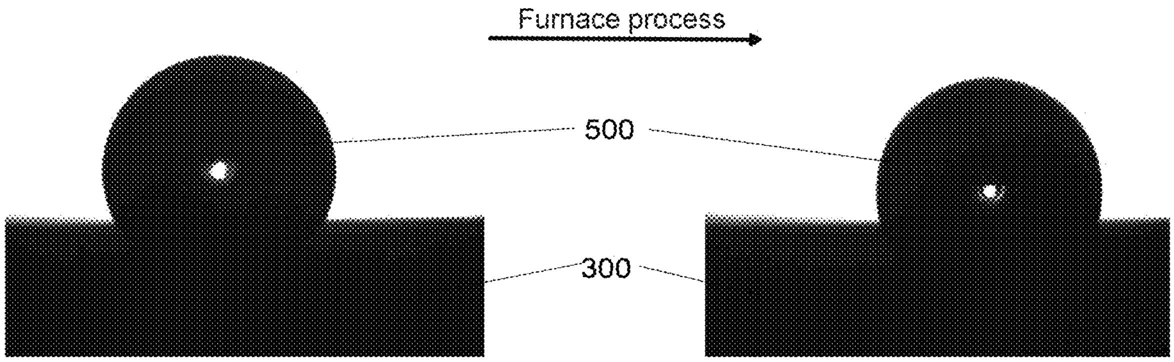
Figure 22:
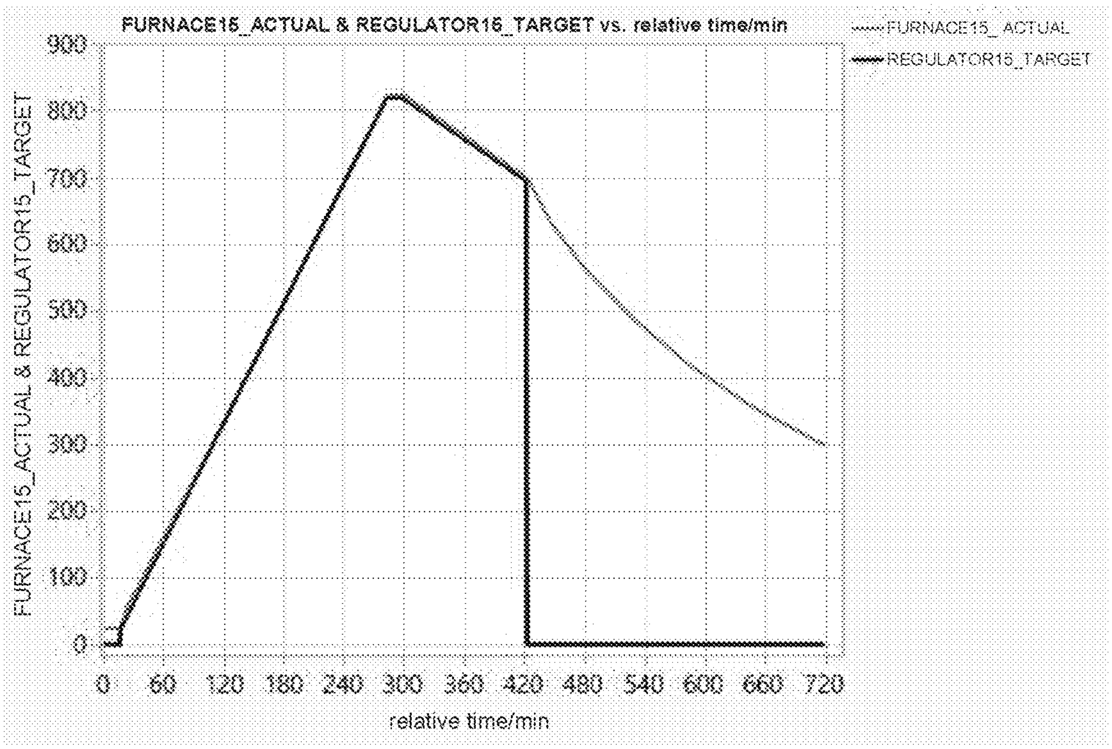
FIGS. 22 and 23 show temperature curves for fusing methods.
Figure 23:
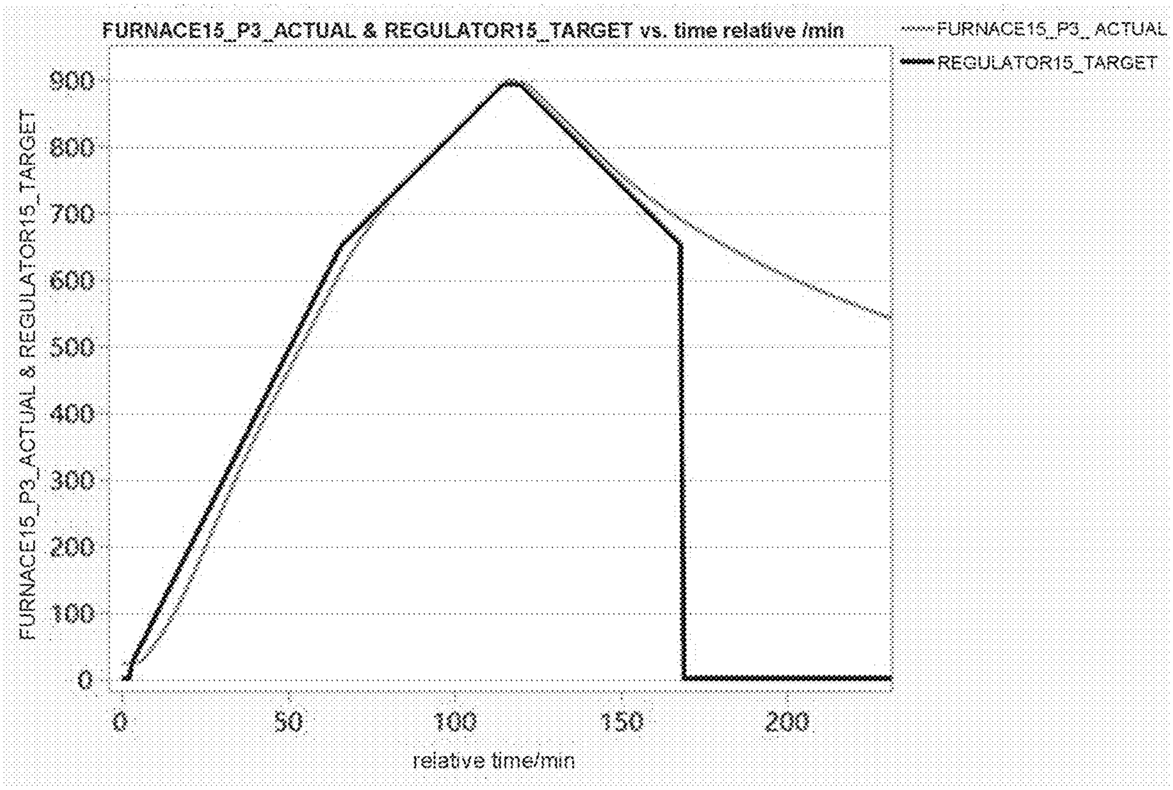

Contour of the fused element, see FIG. 20 (right).

Parameter of surface of the fused half lens: from WLI measurement (measurement field 336*336 μm2): glass surface after fusing $S_q$=2 nm, $S_a$=1 nm. Glass surface before fusing (starting state of preform, see above): $S_g$=5 nm, $S_a$=4 nm

Exemplary Embodiment 1 for Option (b) Melting Method

Glass type: N—LaSF9, converter underlay: silver-coated Ce/YAG, contour preform: cube, edge length (4 mm).

Method steps: cleaning the preform(s); cleaning the converter(s); laying the preform(s) on the converter underlay(s); clean furnace chamber, advantageous: inner sleeve in the furnace due to cleanness and to improve the temperature homogeneity, advantageous: separate cover of the arrangement made up of lens(es) and converter(s) with ceramic vessel.

Figure 24:
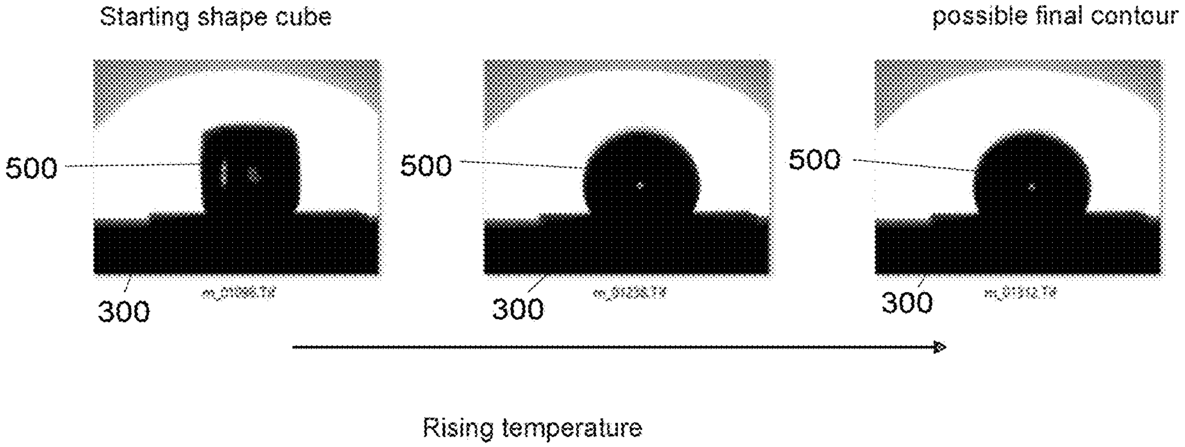
FIG. 24 shows experimental results of a melting method.
Figure 25:
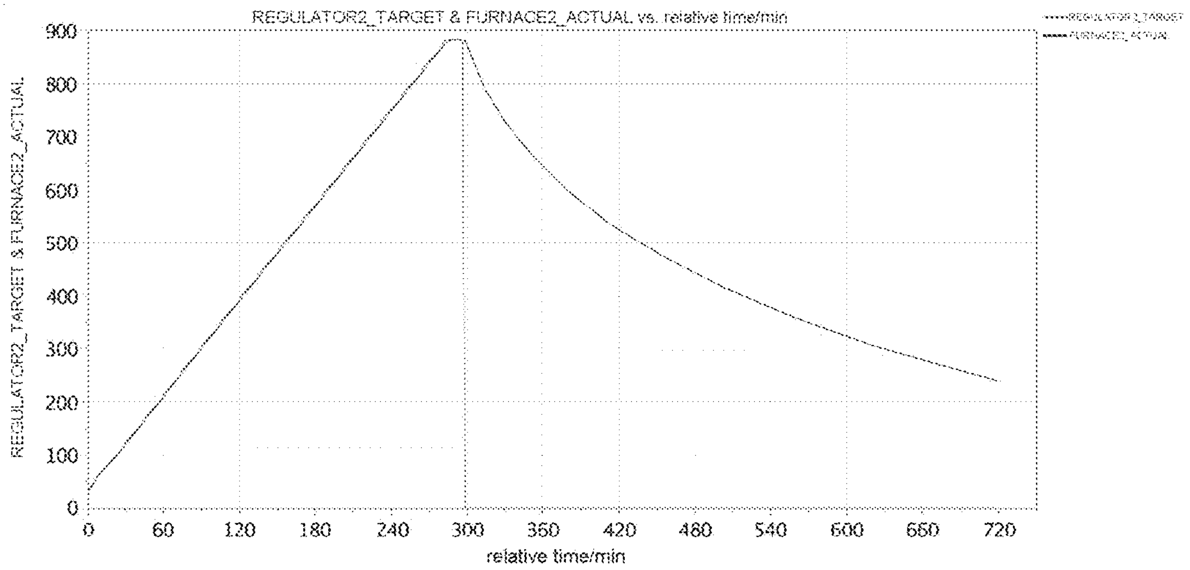
FIG. 25 shows a temperature curve for melting methods.

Contour of the molten element, see FIG. 24 (right).

In summary, using the present invention, for example (i) a decoupling element matched in index of refraction can be applied to a ceramic converter, so that there is an optical contact between them. Furthermore, the optical element (decoupling element) can optionally (ii) be formed so that the fraction of the emitted light which is prevented from being decoupled by total internal reflection is minimized. In particular, the disadvantage of Lambert emission can be addressed hereby. The Lambert emission characteristic of a light source is disadvantageous, since it is often not possible to couple all of the radiation emitted by the light source into a downstream illumination beam path.

Optionally, the two approaches (i) and (ii) are combined. This is because a glass pane matched in index of refraction, which is applied to the converter, would reduce, for example, the light diffusion at the interface converter-glass, but would displace the problem of total reflection to the interface glass-air. The fraction of the light suffering total internal reflection would remain the same. This applies for a glass pane of any index of refraction. For example, a BK-7 glass pane would reduce the critical angle of the total reflection at the glass-air interface, but in return a fraction of the light would already be reflected at the converter-glass interface. On the other hand, a BK-7 hemispherical lens would have an optimum geometry for the light decoupling, but here too a significant part of the light would already also be reflected at the converter-glass interface.

By using inorganic material (glass), a high temperature stability and thus power stability of the arrangement can advantageously be achieved. A matching of the decoupling characteristic to the optical system can advantageously be carried out by problem-matched decoupling elements (e.g., hemispherical lens, ¾ ball lens, nearly spherical ball lens, parabolic light guide element, free-form optical unit). Improved coupling of the blue light and decoupling of the yellow light can advantageously take place due to a coating of the optical element. Furthermore, the emission spectrum of the light can be adapted by a coating. Furthermore, the optical dispersion of the optical element can be compensated by optimized beam paths for the excitation and useful light.

Applied decoupling elements can be, for example, hemispherical lenses, spherical lenses, aspheric lenses, or so-called "parabolic concentrator", parabolically shaped light guide rods, which function like a parabolic mirror on the basis of total internal reflection. The following is to be noted with respect to the geometry of the decoupling element.

A hemispherical lens (apex height=radius) has optimum light decoupling since the entire angle spectrum of the light exiting from the converter can be decoupled. However, this geometry places high demands on the following optical units. Since the light radiates through the interface glass-air perpendicularly, this geometry is particularly suitable for the application of a dielectric coating (for example, a broadband AR coating or a coating which modifies the light color of the exiting light. With a narrowband coating having a green reflection coating, a red shift can even be achieved by reabsorption of green light and following reemission).

A parabolic light guide rod is also capable of decoupling the entire angle spectrum and has a nearly perpendicular light exit at the glass-air interface.

A ball lens having an apex height which is greater than the apex radius (for example, ¾ lens) constricts the angle-dependent intensity distribution, which simplifies the integration of the components into optical systems. However, not all light beams can leave the lens, since some beams are incident at angles on the glass-air interface which are greater than the critical angle of the total reflection.

A lens shape with h>r, which is excellent, is the spherical lens, in which for the apex height h, the relationship $$h = r\frac{n'}{n' - n}$$

applies. Since the following applies for the focal length of a spherical surface $$f' = r\frac{n'}{n' - n},$$

the beam point is located here in the object-side focus and beams close to the axis are collimated. In this case, n is the object-side index of refraction, n' is the image-side index of refraction, r is the radius of curvature of the surface, and f' is the image-side focal length. At apex heights h>r, it can be necessary to deviate from the spherical shape in the converter-side part of the lens. For parts of the light bundle emitted by the converter, in particular for those having high aperture, total reflection can occur, which limits the decoupling cone.

An asphere can be designed so that the exiting light is collimated not only in the vicinity of the apex, but also for beams distant from the axis.

A free-form optical unit can be designed so that the light beams which exceed the critical angle of the total reflection are collimated by a parabolic light guide structure.

Flat lenses (apex height<apex radius) are also not capable of decoupling the entire angle spectrum, but nonetheless offer an improvement over a planar converter.

In the assessment of the best solution, the entire system made up of converter material, the arrangement, and the optical system is always to be observed. It can thus be useful for a simple optical system of a yellow-emitting light source to select only a ¾ lens or a parabolic light guide rod made of glass having an index of refraction which is higher than that of the very thin converter material, which scatters little or not at all.

On the other hand, it can be useful for white light applications in which a scattering converter is required in any case to utilize the intrinsic light confinement of the converter element and to entirely permit an index of refraction jump to the decoupling element, which is then manufactured, however, from a "more good-natured" glass having lower tendency toward crystallization and is more complexly shaped for this purpose, for example, aspheric primary lens, which in combination with a complex free-form optical unit permits optimum light coupling of the primary light and decoupling of the secondary light.

The present invention optionally relates to ceramic luminescence converters irradiated using laser light in remission arrangement having index of refraction n>1.8, by way of which optionally high luminances are generated. The invention also relates to converter arrangements in transmission, non-ceramic converters, and/or an excitation using other light sources instead of lasers, for example LEDs.

The present invention is therefore useful in particular for areas of application in which high luminances are important and in which laser-excited photoluminescent light sources are possibly already used. These are, for example, digital projection, headlights, for example, automobile high beams, automobile headlights, search headlights, microscopy illumination, fibre optics, for example, endoscopy, or machine vision.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An illumination device, comprising:

at least one light source configured for emitting a primary light;

a light conversion element including a front side, the light conversion element being configured for being illuminated using the primary light emitted by the at least one light source and for emitting a secondary light having a different wavelength on the front side; and an optical element, which is applied to the front side of the light conversion element such that a first optical interface is formed between the light conversion element and the optical element, such that the illumination device is configured for the secondary light being coupled from the light conversion element into the optical element at the first optical interface, the optical element including an outer surface which forms a second optical interface to a surrounding medium, the optical element being configured such that both the primary light and the secondary light pass through the optical element, wherein at least one of:

(a) the outer surface includes at least one first surface area extending obliquely to the front side of the light conversion element, such that the illumination device is configured for the secondary light being decoupled at the second optical interface from the optical element into the surrounding medium in a direction which has a smaller angle in relation to a normal of the front side of the light conversion element than if the at least one first surface area were to extend parallel to the front side of the light conversion element; and (b) the outer surface includes at least one second surface area extending obliquely to the front side of the light conversion element, such that the illumination device is configured for the secondary light being reflected at the second optical interface into the optical element in a direction toward the normal of the front side of the light conversion element.

2. The illumination device according to claim 1, wherein the optical element is a first optical element, wherein at least one of:

(a) the light conversion element is configured for being illuminated on the front side using the primary light emitted by the light source;

(b) the outer surface of the first optical element includes a third surface area forming the primary light;

(c) the illumination device is configured such that a part of the primary light directed onto the front side of the light conversion element extends as scattered primary light in a direction of the outer surface of the optical element;

(d) the illumination device includes a beam splitter, which is arranged both in a beam path of the primary light and in a beam path of the secondary light and is configured for deflecting the beam path of the primary light or the beam path of the secondary light by reflection; and (e) the illumination device includes a second optical element, which is configured for at least one of focusing and collimating the secondary light decoupled from the first optical element.

3. The illumination device according to claim 1, wherein at least one of:

(a) the at least one first surface area, at which the illumination device is configured for the secondary light being decoupled from the optical element, is formed by at least one first planar section of the outer surface of the optical element;

(b) the at least one first surface area, at which the illumination device is configured for the secondary light being decoupled from the optical element, is formed by at least one first planar section of the outer surface of the optical element, which extends over a solid angle of at least 0.45π;

(c) the at least one second surface area, at which the illumination device is configured for the secondary light being reflected into the optical element with total reflection, is formed by at least one second planar section of the outer surface of the optical element; and (d) the at least one second surface area, at which the illumination device is configured for the secondary light being reflected into the optical element with total reflection, is formed by at least one second planar section of the outer surface of the optical element, which extends over a solid angle of at least 1π.

4. The illumination device according to claim 3, wherein at least one of:

(a) at least one of (i) the outer surface of the optical element and (ii) the at least one first planar section of the outer surface of the optical element is at least partially spherically shaped;

(b) at least one of (i) the outer surface of the optical element and (ii) the at least one first planar section of the outer surface of the optical element is at least partially spherically shaped over a solid angle of at least 0.45π;

(c) at least one of (i) the outer surface of the optical element and (ii) the at least one second planar section of the outer surface of the optical element is at least partially parabolically shaped; and (d) at least one of (i) the outer surface of the optical element and (ii) the at least one second planar section of the outer surface of the optical element is at least partially parabolically shaped over a solid angle of at least 1π.

5. The illumination device according to claim 3, wherein at least one of:

(a) the illumination device, which is configured for the secondary light being decoupled at the at least one first surface area from the optical element, is configured for the secondary light being decoupled in a direction toward the normal of the front side of the light conversion element;

(b) the outer surface of the optical element is configured for at least one of focusing and collimating the secondary light;

(c) the at least one first surface area, which is configured for being that at which the secondary light is decoupled from the optical element, is configured for the secondary light being decoupled thereon and being decoupled in a center of the first optical interface into the optical element; and (d) the at least one second surface area, which is configured for being that at which the secondary light is reflected into the optical element with total reflection, is configured for the secondary light being reflected thereon and being decoupled in a center of the first optical interface into the optical element.

6. The illumination device according to claim 1, wherein the optical element is at least partially provided with a coating, wherein the outer surface of the optical element is provided at least partially with a coating.

7. The illumination device according to claim 1, wherein at least one of:

(a) the light conversion element includes at least one of the following materials: a ceramic converter material; Ce:YAG; Ce:GYAG; Ce:LuAG; and Ce:GaLuAG;

(b) the light conversion element includes a polycrystalline material;

(c) the light conversion element includes an inorganic material;

(d) the light conversion element includes a monocrystalline material; and (e) the light conversion element has an index of refraction which is greater than 1.5.

8. The illumination device according to claim 1, wherein at least one of:

(a) the optical element includes at least one of the following materials: a glass; LaSF glass; N—LaSF9 glass; LASF35 glass; P-LASF51 glass; SF glass; and a glass equivalent thereto;

(b) the optical element has an index of refraction which is greater than 1.5;

(c) an index of refraction of the optical element is at most 0.3 less than that of the light conversion element;

(d) the optical element consists of a glass, which (i) in a range of 440 nm to 780 nm has an internal transmittance, measured on a 10-mm-thick sample, of at least 90%, and (ii) in a range of 500 nm to 780 nm has an internal transmittance, measured on a 10-mm-thick sample, of at least 97%;

(e) the optical element has a coefficient of thermal expansion $\alpha_{+20/+300° C.}$, which is in a range of 7 to 9.5×10−6 1/K;

(f) the optical element has a difference of a coefficient of thermal expansion between the optical element and the light conversion element, which, in a temperature range between 25° C. and 300° C., is less than 2×10−6 1/K;

(g) the optical element has a glass transition temperature which is below 800° C.; and (h) the optical element has a temperature at which a viscosity is $10^{10}$ dPas which is below 900° C.

9. The illumination device according to claim 1, wherein at least one of:

(a) the light conversion element and the optical element are configured such that a total reflection at the first optical interface first occurs from an angle which is greater than 50°; and (b) the light conversion element and the optical element are configured such that no, or essentially no, total reflection occurs.

10. The illumination device according to claim 1, wherein at least one of:

(a) the optical element is configured for a fraction of the secondary light being decoupled from the optical element into the surrounding medium which is greater than 30%; and (b) the optical element is configured for all or essentially all of the secondary light being decoupled from the optical element into the surrounding medium.

11. A method for producing a light conversion device, the method comprising the steps of:

providing a light conversion element having a front side, the light conversion element being configured for being illuminated using a primary light and for emitting a secondary light having a different wavelength on the front side; and melting a raw material to form an optical element on the front side of the light conversion element, such that a first optical interface is between the light conversion element and the optical element.

12. The method for producing a light conversion device according to claim 11, wherein at least one of:

(a) during the step of melting, the raw material at least essentially maintains a shape of the raw material such that a molten optical element receives an outer surface which at least essentially corresponds to that of the raw material; and (b) a temperature increase takes place during the step of melting such that the raw material reaches a viscosity which is higher than $10^5$ dPas and is lower than $10^{10}$ dPas.

13. The method for producing a light conversion device according to claim 11, wherein at least one of:

(a) during the step of melting, the raw material changes a shape of the raw material such that a molten optical element receives an outer surface which deviates from that of the raw material; and (b) during the step of melting, a temperature increase takes place such that the raw material reaches a viscosity which is lower than $10^6$ dPas.

14. The method for producing a light conversion device according to claim 11, wherein at least one of:

(a) an outer surface of the optical element is at least partially spherically shaped; and (b) wherein an outer surface of the optical element is at least partially parabolically shaped.

15. A light conversion device, comprising:

a light conversion element including a front side, the light conversion element being configured for being illuminated using a primary light and for emitting a secondary light having a different wavelength on the front side; and an optical element, which is applied to the front side of the light conversion element such that a first optical interface is formed between the light conversion element and the optical element, such that the light conversion device is configured for the secondary light being coupled from the light conversion element into the optical element at the first optical interface, the optical element including an outer surface which forms a second optical interface to a surrounding medium, the optical element being configured such that both the primary light and the secondary light pass through the optical element, wherein at least one of:

(a) the outer surface includes at least one first surface area extending obliquely to the front side of the light conversion element, such that the light conversion device is configured for the secondary light being decoupled at the second optical interface from the optical element into the surrounding medium in a direction which has a smaller angle in relation to the normal of the front side of the light conversion element than if the at least one first surface area were to extend parallel to the front side of the light conversion element; and (b) the outer surface includes at least one second surface area extending obliquely to the front side of the light conversion element, such that the light conversion device is configured for secondary light being reflected at the second optical interface into the optical element in a direction toward the normal of the front side of the light conversion element.

16. The light conversion device according to claim 15, wherein at least one of:

(a) the at least one first surface area, at which the light conversion device is configured for the secondary light being decoupled from the optical element, is formed by at least one first planar section of the outer surface of the optical element;

(b) the at least one first surface area, at which the light conversion device is configured for the secondary light being decoupled from the optical element, is formed by at least one first planar section of the outer surface of the optical element, which extends over a solid angle of at least 0.45π;

(c) the at least one second surface area, at which the light conversion device is configured for the secondary light being reflected into the optical element with total reflection, is formed by at least one second planar section of the outer surface of the optical element; and (d) the at least one second surface area, at which the light conversion device is configured for the secondary light being reflected into the optical element with total reflection, is formed by at least one second planar section of the outer surface of the optical element, which extends over a solid angle of at least 1π.

17. The light conversion device according to claim 16, wherein at least one of:

(a) at least one of (i) the outer surface of the optical element and (ii) the at least one first planar section of the outer surface of the optical element is at least partially spherically shaped;

(b) at least one of (i) the outer surface of the optical element and (ii) the at least one first planar section of the outer surface of the optical element is at least partially spherically shaped over a solid angle of at least 0.45π;

(c) at least one of (i) the outer surface of the optical element and (ii) the at least one second planar section of the outer surface of the optical element is at least partially parabolically shaped; and (d) at least one of (i) the outer surface of the optical element and (ii) the at least one second planar section of the outer surface of the optical element is at least partially parabolically shaped over a solid angle of at least 1π.

18. The light conversion device according to claim 16, wherein at least one of:

(a) the light conversion device, which is configured for the secondary light being decoupled at the at least one first surface area from the optical element, is configured for the secondary light being decoupled in a direction toward the normal of the front side of the light conversion element;

(b) the outer surface of the optical element is configured for at least one of focusing and collimating the secondary light;

(c) the at least one first surface area, which is configured for being that at which the secondary light is decoupled from the optical element, is configured for the secondary light being decoupled thereon and being decoupled in a center of the first optical interface into the optical element; and (d) the at least one second surface area, which is configured for being that at which the secondary light is reflected into the optical element with total reflection, is configured for the secondary light being reflected thereon and being decoupled in a center of the first optical interface into the optical element.

19. The light conversion device according to claim 15, wherein the optical element is at least partially provided with a coating, wherein the outer surface of the optical element is provided at least partially with a coating.

20. The light conversion device according to claim 15, wherein at least one of:

(a) the light conversion element (300) includes at least one of the following materials: a ceramic converter material; Ce:YAG; Ce:GYAG; Ce:LuAG; and Ce:GaLuAG;

(b) the light conversion element includes a polycrystalline material;

(c) the light conversion element includes an inorganic material;

(d) the light conversion element includes a monocrystalline material; and (e) the light conversion element has an index of refraction which is greater than 1.5.

21. The light conversion device according to claim 15, wherein at least one of:

(a) the optical element includes at least one of the following materials: a glass; LaSF glass; N—LaSF9 glass; LASF35 glass; P-LASF51 glass; SF glass; and a glass equivalent thereto;

(b) the optical element has an index of refraction which is greater than 1.5;

(c) an index of refraction of the optical element is at most 0.3 less than that of the light conversion element;

(d) the optical element consists of a glass, which (i) in a range of 440 nm to 780 nm has an internal transmittance, measured on a 10-mm-thick sample, of at least 90%, and (ii) in a range of 500 nm to 780 nm has an internal transmittance, measured on a 10-mm-thick sample, of at least 97%;

(e) the optical element has a coefficient of thermal expansion $\alpha_{+20/+300° C.}$, which is in a range of 7 to 9.5×10−6 l/K;

(f) the optical element has a difference of a coefficient of thermal expansion between the optical element and the light conversion element, which, in a temperature range between 25° C. and 300° C., is less than 2×10−6 l/K;

(g) the optical element has a glass transition temperature which is below 800° C.; and (h) the optical element has a temperature at which a viscosity is $10^{10}$ dPas which is below 900° C.

22. The light conversion device according to claim 15, wherein at least one of:

(a) the light conversion element and the optical element are configured such that a total reflection at the first optical interface first occurs from an angle which is greater than 50°; and (b) the light conversion element and the optical element are configured such that no, or essentially no, total reflection occurs.

23. The light conversion device according to claim 15, wherein at least one of:

(a) the optical element is configured for a fraction of the secondary light being decoupled from the optical element into the surrounding medium which is greater than 30%; and (b) the optical element is configured for all or essentially all of the secondary light being decoupled from the optical element into the surrounding medium.

* * * * *